US008589123B2

(12) United States Patent  
Uraki et al.

(10) Patent No.: US 8,589,123 B2  
(45) Date of Patent: Nov. 19, 2013

(54) DEVICE-LAYOUT GUIDING APPARATUS AND DEVICE-LAYOUT GUIDING METHOD

(75) Inventors: Yasushi Uraki, Kawasaki (JP); Junichi Ishimine, Kawasaki (JP); Ikuro Nagamatsu, Kawasaki (JP); Masahiro Suzuki, Kawasaki (JP); Tadashi Katsui, Kawasaki (JP); Yuji Ohba, Kawasaki (JP); Nobuyoshi Yamaoka, Kawasaki (JP); Akira Ueda, Kawasaki (JP); Sayoko Tominaga, Kawasaki (JP); Seiichi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 12/787,587

(22) Filed: May 26, 2010

(65) Prior Publication Data

US 2010/0318329 A1    Dec. 16, 2010

(30) Foreign Application Priority Data

Jun. 10, 2009   (JP) .................................. 2009-139273

(51) Int. Cl.  
*G06F 17/50* (2006.01)

(52) U.S. Cl.  
USPC ............................................................. 703/1

(58) Field of Classification Search  
USPC ............................................................. 703/1  
See application file for complete search history.

(56) References Cited

U.S. PATENT DOCUMENTS

| 2003/0074164 A1 | 4/2003 | Simmons et al. |
| 2003/0115024 A1 | 6/2003 | Snevely |
| 2007/0078635 A1 | 4/2007 | Rasmussen et al. |
| 2007/0288207 A1 | 12/2007 | Backe et al. |
| 2009/0076779 A1 | 3/2009 | Simmons et al. |

FOREIGN PATENT DOCUMENTS

| JP | 8-012674 B2 | 2/1996 |
| JP | 08-30672 A | 2/1996 |
| JP | 2004-164269 A | 6/2004 |
| JP | 2004-185177 A | 7/2004 |
| JP | 2010-133645 A | 6/2010 |

OTHER PUBLICATIONS

Great Britain Search Report under Section 17(5) dated Sep. 20, 2010, issued in corresponding Great Britain Patent Application No. GB1008328.5.

Japanese Office Action dated Jan. 22, 2013, issued in corresponding Japanese Patent Application No. 2009-139273, w/ English translation.

*Primary Examiner* — Hugh Jones  
(74) *Attorney, Agent, or Firm* — Westerman, Hattori, Daniels & Adrian, LLP

(57) ABSTRACT

There are included a location-information management unit that manages location information of devices arranged in a spatial layout on a screen, a device-feature management unit that manages device features of the devices, a guide-information generation unit that reads the location information and the device features of the devices arranged in the spatial layout from the location-information management unit and the device-feature management unit respectively and generates device-layout guide information allowing for the device features of the devices based on the read location information and device features of the devices, and a monitor unit that guides and displays the device-layout guide information generated by the guide-information generation unit.

7 Claims, 21 Drawing Sheets

| 24A | 24B | 24C |
|---|---|---|
| RACK NUMBER | LOCATION(X, Y) | TYPE |
| RACK 1 | 100, 100 | RACK A |
| RACK 2 | 100, 300 | RACK A |
| RACK 3 | 100, 500 | RACK A |
| RACK 3 | 100, 700 | RACK B |
| RACK 4 | 100, 900 | RACK C |

| 25A | 25B | 25C |
|---|---|---|
| RACK NUMBER | IT NUMBER | LOCATION(Z) |
| RACK 1 | IT-DEVICE 1 | 3 |
|  | IT-DEVICE 2 | 4 |
|  | IT-DEVICE 3 | 6 |
|  | IT-DEVICE 4 | 7 |
| RACK 2 | IT-DEVICE 2 | 2 |
|  | ... | ... |

| 26A | 26B |
|---|---|
| DISTRIBUTION-BOARD NUMBER | LOCATION(X, Y) |
| DISTRIBUTION BOARD 1 | 600, 10 |
| DISTRIBUTION BOARD 2 | 1200, 10 |
| DISTRIBUTION BOARD 3 | 1800, 10 |

| 27A | 27B | 27C | 27D | 27E |
|---|---|---|---|---|
| DISTRIBUTION-BOARD NUMBER | BREAKER NUMBER | CAPACITY | RACK NUMBER | LOCATION(Z) |
| DISTRIBUTION BOARD 1 | 1 | 20 | RACK 1 | 2, 3 |
| | 2 | 20 | RACK 1 | 4 |
| | 3 | 20 | RACK 1 | 6 |
| | 4 | 20 | RACK 1 | 7 |

| 28A | 28B | 28C |
|---|---|---|
| GRILLE NUMBER | LOCATION(X, Y) | TYPE |
| GRILLE 1 | 50, 100 | GRILLE A |
| GRILLE 2 | 50, 300 | GRILLE B |
| GRILLE 3 | 50, 500 | GRILLE A |
| ... | ... | ... |

| | 31A | 31B | 31C | 31D | 31E | 31F |
|---|---|---|---|---|---|---|
| | TYPE | COOLING AMOUNT | AIR-BLOWING AMOUNT | AIR-BLOWING DIRECTION | DIMENSIONS (XYZ) | HEAT GENERATION AMOUNT |
| | AIR-CONDITIONING A | 500 | 1.0 m³/s | STRAIGHT | 120*50*180 | 100 |
| | AIR-CONDITIONING B | 300 | 1.2 m³/s | STRAIGHT | 120*50*180 | 50 |
| | AIR-CONDITIONING C | 800 | 1.5 m³/s | CENTER | 120*50*180 | 150 |

| 32A | 32B |
|---|---|
| TYPE | DIMENSIONS(XYZ) |
| RACK A | 120*150*180 |
| RACK B | 120*150*180 |
| RACK C | 120*150*180 |
| ... | ... |

| 33A | 33B | 33C | 33D | 33E |
|---|---|---|---|---|
| IT NUMBER | HEAT GENERATION AMOUNT | REQUIRED AIR VOLUME | OCCUPANCY | ELECTRICITY USE |
| IT-DEVICE 1 | 100 | 0.03 m³/s | 1U | 10 |
| IT-DEVICE 2 | 150 | 0.03 m³/s | 2U | 15 |
| IT-DEVICE 3 | 250 | 0.06 m³/s | 2U | 20 |
| IT-DEVICE 4 | 25 | 0.01 m³/s | 1U | 10 |
| IT-DEVICE 5 | 75 | 0.02 m³/s | 3U | 10 |
| ... | ... | ... | ... | ... |

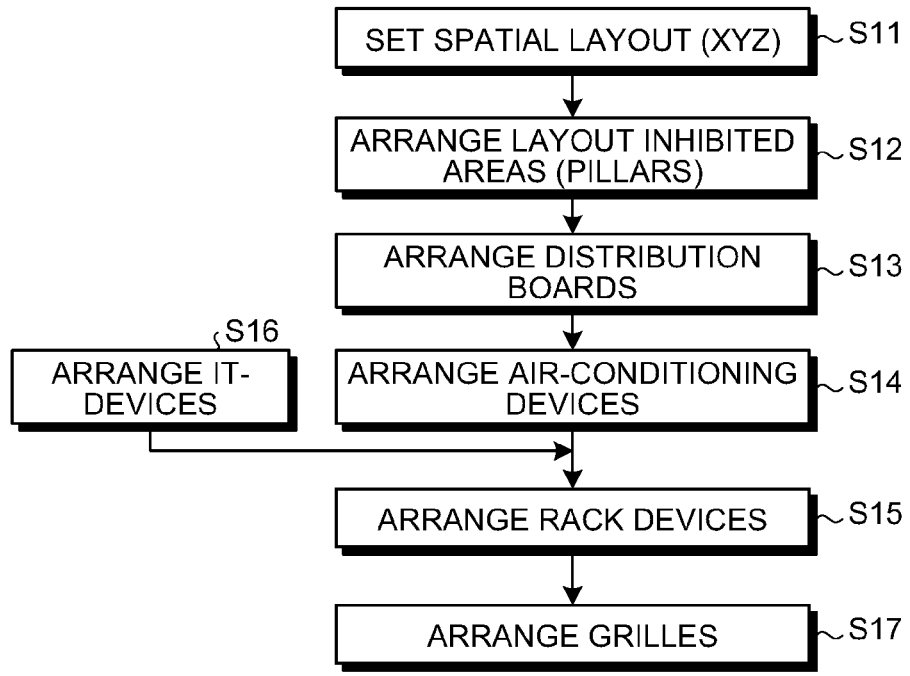
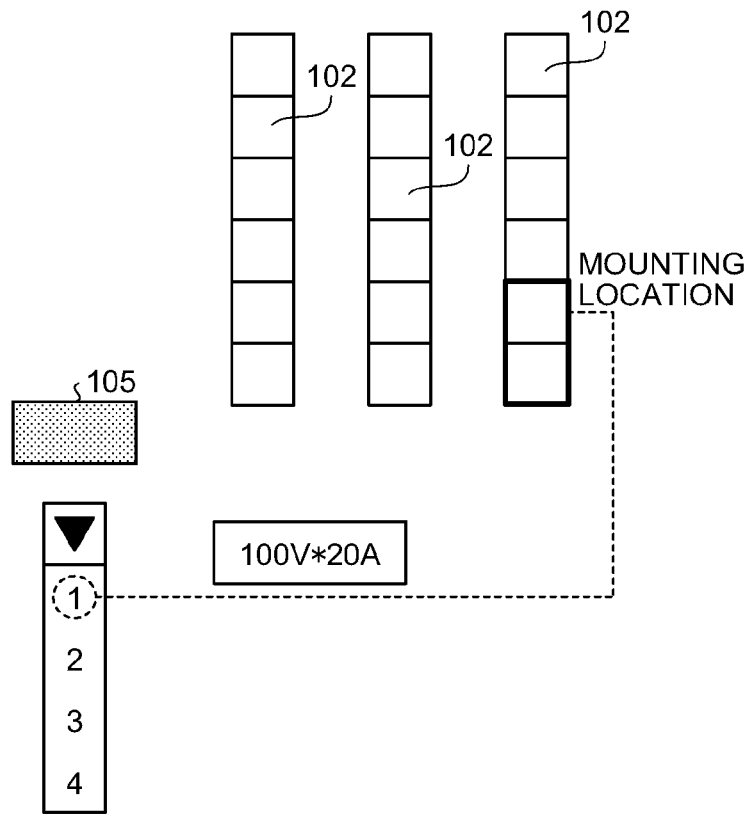

DEVICE-LAYOUT GUIDING APPARATUS AND DEVICE-LAYOUT GUIDING METHOD

CROSS-REFERENCE TO RELATED APPLICATION(S)

This application is based upon and claims the benefit of priority of the prior Japanese Patent Application No. 2009-139273, filed on Jun. 10, 2009, the entire contents of which are incorporated herein by reference.

FIELD

The embodiments discussed herein are directed to a device-layout guiding apparatus and a device-layout guiding method for guiding a device layout in which devices such as electronic devices are virtually arranged in a predetermined space representing the interior of a room on a monitor screen.

BACKGROUND

Conventionally, a device-layout guiding apparatus for guiding a device layout of devices such as electronic devices which are virtually arranged in a predetermined space representing the interior of a room on a monitor screen guides a device layout of devices such as electronic devices and air-conditioning devices which are virtually arranged in a predetermined space on a monitor screen.

Besides, the conventional device-layout guiding apparatus separately manages location information of a layout of the devices such as the electronic devices and the air-conditioning devices arranged in the predetermined space and device features such as a heat generation amount of the electronic device and a cooling amount of the air-conditioning device. Therefore, when a device layout allowing for a heat distribution of the electronic devices is to be guided by using the location information and the device features, for example, a thermo-fluid analysis is generally used.

Such conventional apparatuses are disclosed in for example Japanese Examined Patent Application Publication No. 08-12674 and Japanese Laid-open Patent Publication No. 2004-185177.

However, when the device layout is guided using the thermo-fluid analysis, the device-layout guiding apparatus requires a large amount of time for a large scale of the analysis. Thus, even if the device layout due to the thermo-fluid analysis is to be eventually guided to a user side, many users wish to be guided to the device layout in a simple manner before the thermo-fluid analysis is implemented.

SUMMARY

According to an aspect of an embodiment of the invention, a device-layout guiding apparatus includes a location-information management unit that manages location information of devices arranged in a predetermined space on a screen; a device-feature management unit that manages device features of the devices; a guide-information generation unit that reads the location information and the device features of the devices arranged in the predetermined space from the location-information management unit and the device-feature management unit respectively, and generates device-layout guide information allowing for the device features of the devices based on read location information and device features of the devices; and a guide unit that guides and outputs the device-layout guide information generated by the guide-information generation unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is an explanatory diagram briefly representing a table content of a rack location table in the location-information management unit;

FIG. 8 is an explanatory diagram briefly representing a table content of a rack unit table in the location-information management unit;

FIG. 9 is an explanatory diagram briefly representing a table content of a distribution-board location table in the location-information management unit;

FIG. 13 is an explanatory diagram briefly representing a table content of an air-conditioning feature table in a device-feature management unit;

FIG. 14 is an explanatory diagram briefly representing a table content of a rack feature table in the device-feature management unit;

FIG. 15 is an explanatory diagram briefly representing a table content of an IT-device feature table in the device-feature management unit;

FIG. 19 is a flowchart of a processing operation in a control unit related to a device layout process;

FIG. 20 is an explanatory diagram briefly illustrating a guide content of a distribution-board layout guide;

DESCRIPTION OF EMBODIMENTS

Preferred embodiments of the present invention will be explained with reference to accompanying drawings. The present invention is not limited to the embodiments.

[a] First Embodiment

Figure 1:
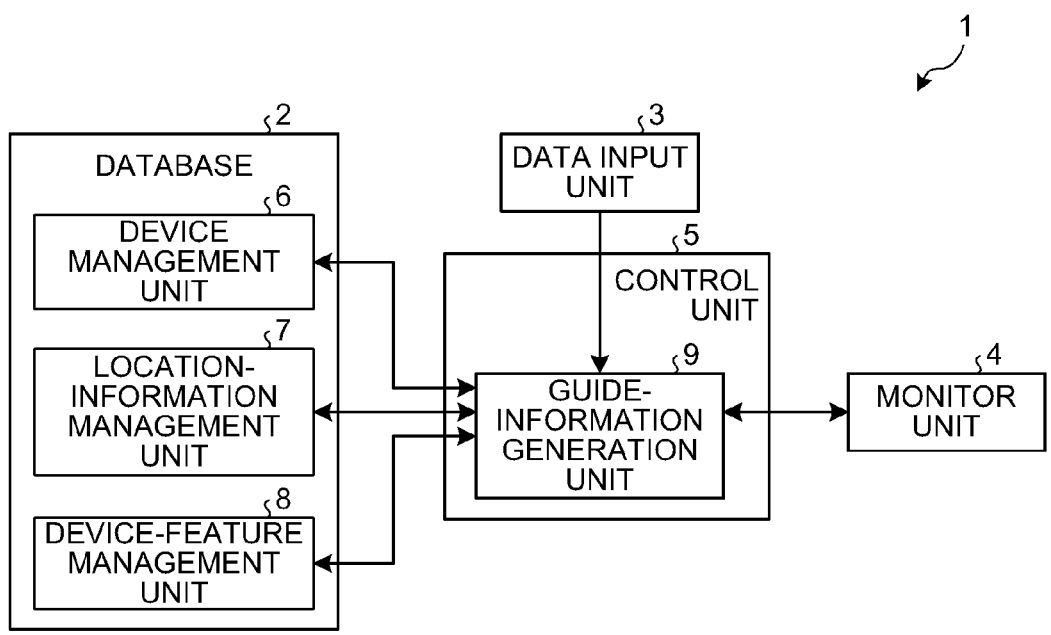
FIG. 1 is a block diagram of a schematic internal configuration of a device-layout guiding apparatus according to a first embodiment.

FIG. 1 is a block diagram of a schematic internal configuration of a device-layout guiding apparatus according to a first embodiment.

A device-layout guiding apparatus 1 as represented in FIG. 1 corresponds to, for example, a computer device that displays a spatial layout representing a floor or the like on a monitor screen and virtually arranges devices in the spatial layout displayed on the screen in a two-dimensional or a three-dimensional manner through a data input unit to thereby enable simple expression of a device layout.

The device-layout guiding apparatus 1 includes a database 2 that registers and manages various data, a data input unit 3 through which various data are input, a monitor unit 4 that displays various data on its screen, and a control unit 5 that controls the whole of the device-layout guiding apparatus 1.

The database 2 includes a device management unit 6 that manages device tools arranged in a spatial layout representing a floor or the like, a location-information management unit 7 that manages location information of devices arranged in the spatial layout, and a device-feature management unit 8 that manages device features of the devices.

The devices mentioned here correspond to electronic devices such as IT-devices and to air-conditioning devices that cool down the heat of the electronic devices. Moreover, the device tools managed by the device management unit 6 correspond to display data for device identification of the devices arranged in the spatial layout during screen display.

The device features correspond to, for example, a heat generation amount in the case of the electronic device and a cooling amount being cooling performance in the case of the air-conditioning device. A relationship between the heat generation amount of the electronic device and the cooling amount of the air-conditioning device is such that because these amounts have the same corresponding values, if the heat generation amount of the electronic device is set to "100" and the cooling amount of the air-conditioning device is set to "100", then 100−100=0. Consequently, it is estimated that the heat generation amount of the electronic device can be cooled down to an appropriate temperature by the cooling amount of the air-conditioning device.

Furthermore, the control unit 5 includes a guide-information generation unit 9 that reads the location information and the device features of devices arranged in the spatial layout from the location-information management unit 7 and the device-feature management unit 8 respectively, and generates device-layout guide information allowing for the device features of the devices based on the read location information of the devices and the read device features thereof.

When the device features of devices, for example, the heat generation amount of the electronic devices and the cooling amount of the air-conditioning devices are taken into account, the device-layout guide information corresponds to guide information of a device layout including an estimated result obtained by estimating whether the heat generation amount of the electronic device can be cooled down to an appropriate temperature by the cooling amount of the air-conditioning device.

The device-layout guiding apparatus 1 further includes the monitor unit 4 for guiding and displaying the guide information of the device layout generated by the guide-information generation unit 9.

Next, an operation of the device-layout guiding apparatus 1 according to the first embodiment will be explained below.

The device-layout guiding apparatus 1 displays a spatial layout on the screen of the monitor unit 4 and arranges devices such as electronic devices and air-conditioning devices in the spatial layout during screen display through the data input unit 3.

Moreover, when the devices such as the electronic devices and the air-conditioning devices are arranged in the spatial layout through the data input unit 3, the control unit 5 of the device-layout guiding apparatus 1 registers the location information of these electronic devices and air-conditioning devices in the location-information management unit 7 for management thereof.

The guide-information generation unit 9 of the control unit 5 reads the location information related to the devices such as the electronic devices and the air-conditioning devices from the location-information management unit 7 according to a predetermined operation through the data input unit 3.

Furthermore, the guide-information generation unit 9 reads the heat generation amount of the electronic device and the cooling amount of the air-conditioning device from the device-feature management unit 8, estimates whether the heat generation amount of the electronic device can be cooled down to an appropriate temperature by the cooling amount of the air-conditioning device based on the location information of the electronic device and the air-conditioning device and also based on the heat generation amount of the electronic device and the cooling amount of the air-conditioning device, and displays the device-layout guide information including the estimated result on the screen of the monitor unit 4.

As a result, the user of the device-layout guiding apparatus 1 views the device-layout guide information including the estimated result during screen display on the monitor unit 4, and can recognize beforehand that the cooling amount of the air-conditioning device arranged in the spatial layout allows the heat generation amount of the electronic device to be cooled down to an appropriate temperature without execution of the thermo-fluid analysis.

The first embodiment is configured to read the location information of the devices arranged in the spatial layout and the device features of the devices from the location-information management unit 7 and the device-feature management unit 8 respectively, generate device-layout guide information allowing for the device features of the devices based on the read location information of the devices and the read device features thereof, and guide and display the generated device-layout guide information on the monitor unit 4. As a result, in the first embodiment, by generating the device-layout guide information allowing for the device features of the devices based on the location information and the device features of the devices, the device layout allowing for the device features can be guided quickly and in a simple manner.

Furthermore, the first embodiment is configured to read the location information of the electronic device and the air-conditioning device arranged in the spatial layout, the cooling amount of the air-conditioning device, and the heat generation amount of the electronic device from the location-information management unit 7 and the device-feature management unit 8 respectively, estimate whether the heat generation amount of the electronic device and the cooling amount of the air-conditioning device can be cooled down to an appropriate temperature based on the read location information of the electronic device and the air-conditioning device and also based on the read heat generation amount of the electronic device and the read cooling amount of the air-conditioning device, and guide and display the device-layout guide information including the estimated result on the monitor unit 4. As a result, in the first embodiment, the device layout allowing for the heat generation amount of the electronic devices and the cooling amount of the air-conditioning devices can be guided on the monitor unit 4 quickly and in a simple manner.

The first embodiment has explained the devices by exemplifying the electronic devices and the air-conditioning devices. However, there are added to the embodiment, in addition to the electronic devices and the air-conditioning devices, a rack device with the electronic device mounted therein, a grille through which cooling air from the air-conditioning device passes, and a distribution board for supplying power to the electronic devices, and the embodiment with these devices will be explained below as a second embodiment.

[b] Second Embodiment

Figure 2:
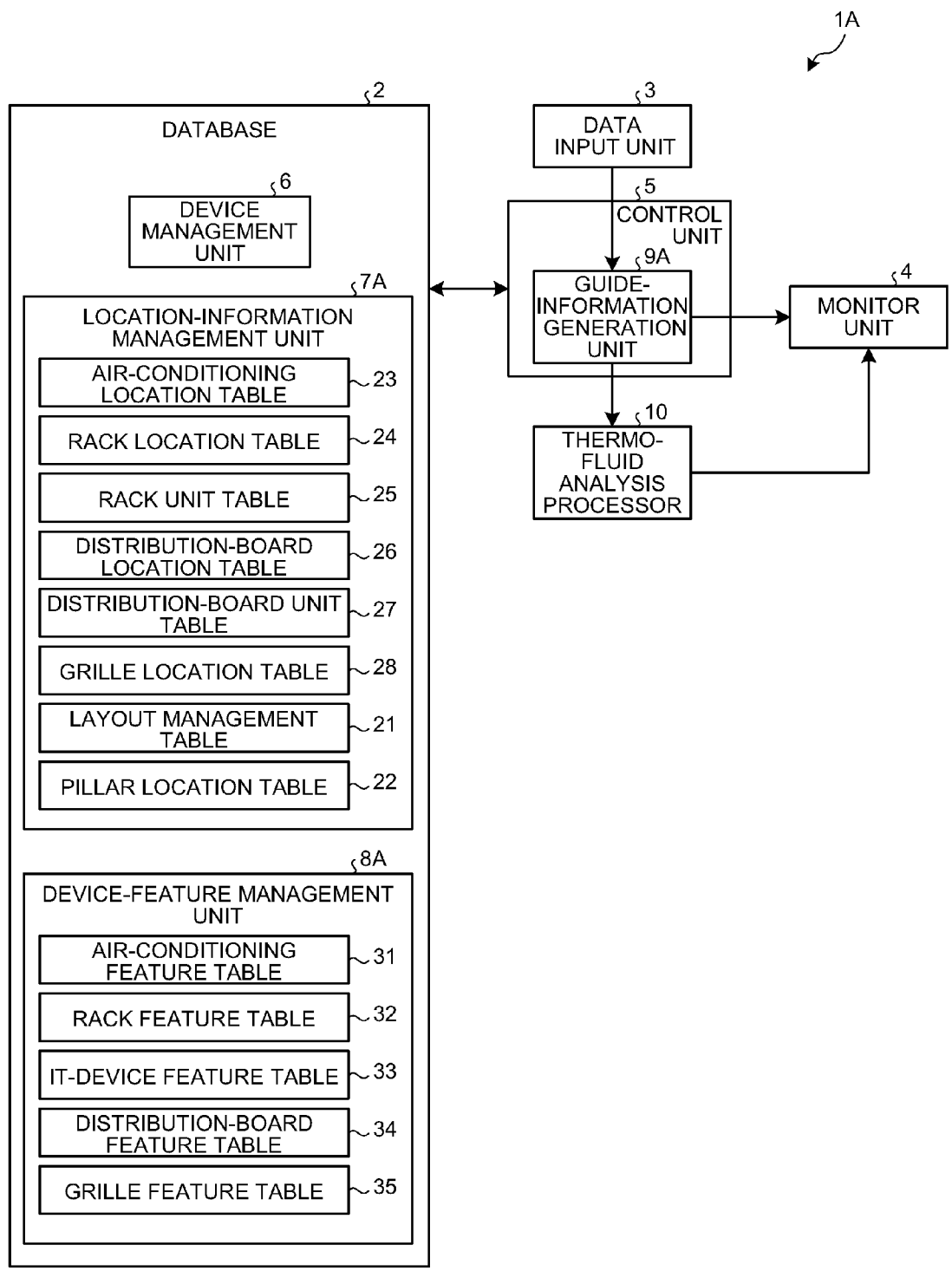
FIG. 2 is a block diagram of a schematic internal configuration of a device-layout guiding apparatus according to a second embodiment.
Figure 3:
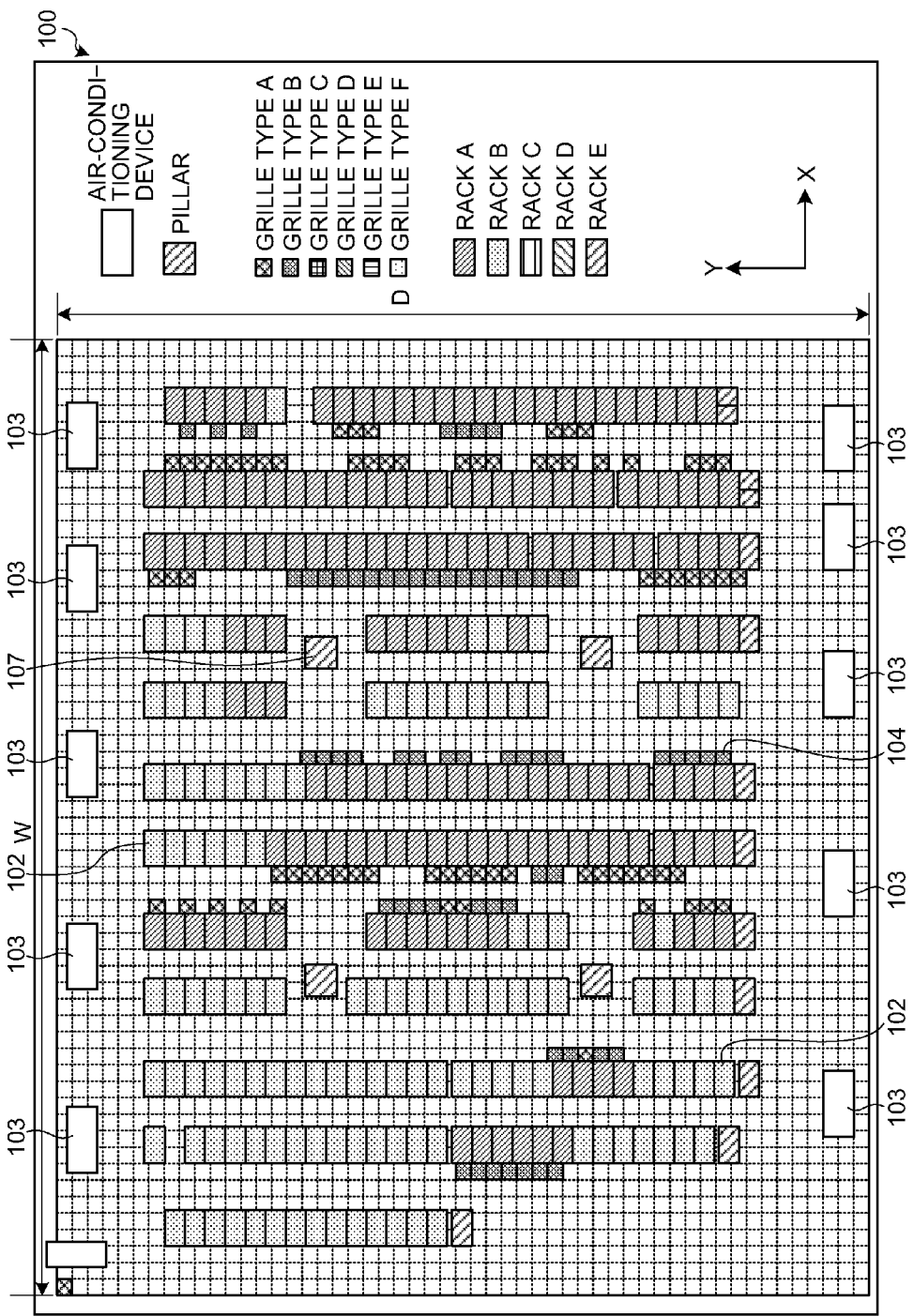
FIG. 3 is an explanatory diagram briefly illustrating a spatial layout screen during screen display on a monitor unit.

FIG. 2 is a block diagram of a schematic internal configuration of a device-layout guiding apparatus according to the second embodiment, and FIG. 3 is an explanatory diagram briefly illustrating a spatial layout screen during screen display on the monitor unit 4. It should be noted that the same numerals are assigned to the same configuration as that of the device-layout guiding apparatus 1 represented in FIG. 1, and thus, explanation of the overlapping configuration and operations is omitted.

A device-layout guiding apparatus 1A represented in FIG. 2 includes a thermo-fluid analysis processor 10 for performing a thermo-fluid analysis process, in addition to the database 2, the data input unit 3, the monitor unit 4, and the control unit 5.

The database 2 includes the device management unit 6, a location-information management unit 7A, and a device-feature management unit 8A. The control unit 5 includes a guide-information generation unit 9A.

The device management unit 6 manages device-display data for identifying and displaying devices such as a plurality of types of IT-devices 101, a plurality of types of rack devices 102 in which these IT-devices 101 can be mounted, a plurality of types of air-conditioning devices 103, a plurality of types of grilles 104, and a plurality of types of distribution boards 105, on a spatial layout screen 100 during display on the monitor unit 4 represented in FIG. 3.

When devices are arranged, in a drag-and-drop manner, on the spatial layout 100 in a tile format of XYZ coordinates during screen display on the monitor unit 4, the location-information management unit 7A manages location information of the devices in coordinates. The location information of the devices is managed in the XYZ coordinates, and, for example, when a plurality of IT-devices 101 are mounted in the rack device 102, the plurality of IT-devices 101 mounted therein are on the same axes of XY coordinates. Thus, mounting locations of the IT-devices 101 in the rack device 102 can be identified by the Z coordinate.

Furthermore, the location-information management unit 7A includes a layout management table 21 for managing all coordinates of the spatial layout, a pillar location table 22 for managing locations of pillars being a device layout inhibited area on the spatial layout, and an air-conditioning location table 23 for managing coordinates of the air-conditioning devices 103 arranged in the spatial layout.

The location-information management unit 7A also includes a rack location table 24 for managing coordinates of the rack devices 102 arranged in the spatial layout, and a rack unit table 25 for managing mounting contents of each of the rack devices 102 arranged in the spatial layout.

The location-information management unit 7A further includes a distribution-board location table 26 for managing coordinates of the distribution boards 105 arranged in the spatial layout, a distribution-board unit table 27 for managing mounting contents of the distribution boards 105 arranged in the spatial layout, and a grille location table 28 for managing coordinates of the grilles 104 arranged in the spatial layout.

Figure 4:
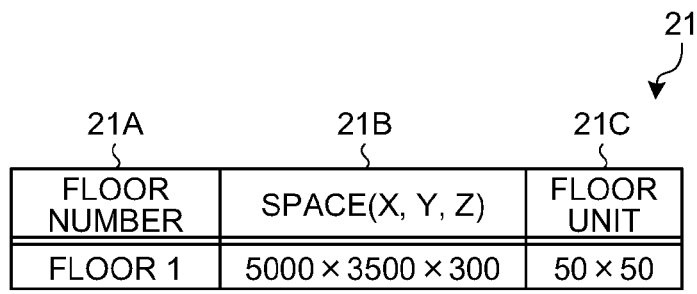
FIG. 4 is an explanatory diagram briefly representing a table content of a layout management table in a location-information management unit.

FIG. 4 is an explanatory diagram briefly representing a table content of the layout management table 21 in the location-information management unit 7A.

The layout management table 21 represented in FIG. 4 manages dimensions 21B with XYZ coordinates of an overall spatial layout 100 representing a floor and a floor unit 21C of the floor with each floor number 21A for identifying the floor.

Figure 5:
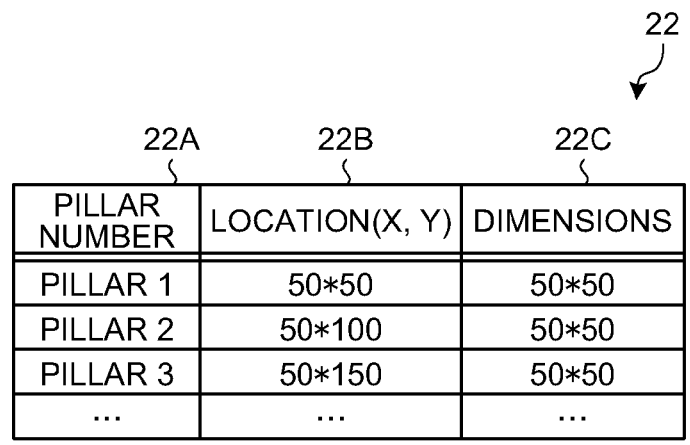
FIG. 5 is an explanatory diagram briefly representing a table content of a pillar location table in the location-information management unit.

FIG. 5 is an explanatory diagram briefly representing a table content of the pillar location table 22 in the location-information management unit 7A.

The pillar location table 22 represented in FIG. 5 manages XY coordinates 22B indicating a coordinate location of a pillar 107 arranged in the spatial layout 100 and dimensions 22C of the pillar 107 with each pillar number 22A for identifying the pillar 107 arranged in the spatial layout 100. The pillar 107 arranged in the spatial layout 100 is acquired from architectural data of the floor, and is a layout inhibited area of devices such as the IT-device 101, the rack device 102, the air-conditioning device 103, the grille 104, and the distribution board 105.

Figure 6:
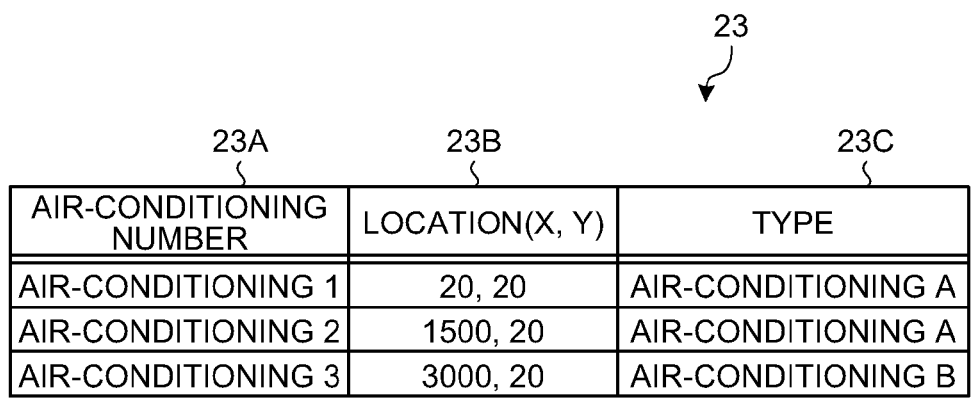
FIG. 6 is an explanatory diagram briefly representing a table content of an air-conditioning location table in the location-information management unit.

FIG. 6 is an explanatory diagram briefly representing a table content of the air-conditioning location table 23 in the location-information management unit 7A.

The air-conditioning location table 23 represented in FIG. 6 manages XY coordinates 23B indicating a coordinate location of the air-conditioning device 103 arranged in the spatial layout 100 and a type 23C indicating a type of the air-conditioning device 103 with each air-conditioning number 23A for identifying the air-conditioning device 103 arranged in the spatial layout 100.

FIG. 7 is an explanatory diagram briefly representing a table content of the rack location table 24 in the location-information management unit 7A.

The rack location table 24 represented in FIG. 7 manages XY coordinates 24B indicating a coordinate location of the rack device 102 arranged in the spatial layout 100 and a type 24C indicating a type of the rack device 102 with each rack number 24A for identifying the rack device 102 arranged in the spatial layout 100.

FIG. 8 is an explanatory diagram briefly representing a table content of the rack unit table 25 in the location-information management unit 7A.

The rack unit table 25 represented in FIG. 8 manages an IT number 25B for identifying an IT-device 101 mounted in the rack device 102 with each rack number 25A for identifying the rack device 102.

Moreover, the rack unit table 25 manages a Z coordinate 25C being a mounting location in the rack device 102 with each IT number 25B.

FIG. 9 is an explanatory diagram briefly representing a table content of the distribution-board location table 26 in the location-information management unit 7A.

The distribution-board location table 26 represented in FIG. 9 manages XY coordinates 26B indicating a coordinate location of the distribution board 105 arranged in the spatial layout 100 with each distribution board number 26A for identifying the distribution board 105 arranged in the spatial layout 100.

Figures 10, 11, 12:
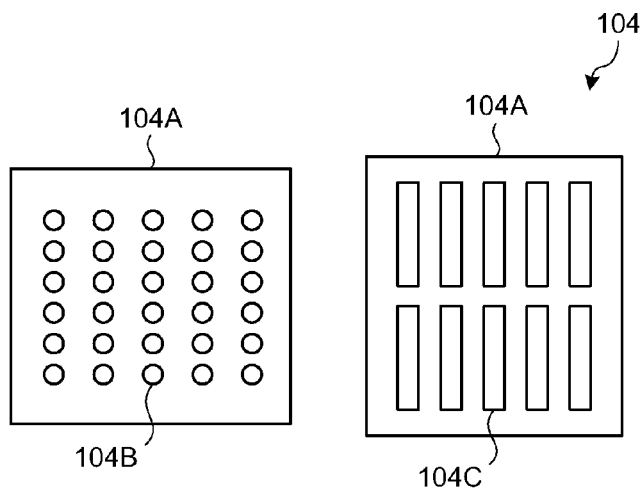
FIG. 10 is an explanatory diagram briefly representing a table content of a distribution-board unit table in the location-information management unit.
FIG. 11 is an explanatory diagram briefly representing a table content of a grille location table in the location-information management unit.
FIG. 12 is an explanatory diagram briefly representing types of a grille.

FIG. 10 is an explanatory diagram briefly representing a table content of the distribution-board unit table 27 in the location-information management unit 7A.

The distribution-board unit table 27 represented in FIG. 10 manages a breaker number 27B for identifying each breaker of the distribution board 105 with each distribution board number 27A for identifying the distribution board 105.

The distribution-board unit table 27 also manages power capacity 27C of the breaker, a rack number 27D for identifying the rack device 102 with the IT-device 101 as a power supply destination of the breaker, and a Z coordinate 27E indicating a mounting location thereof with each breaker number 27B.

FIG. 11 is an explanatory diagram briefly representing a table content of the grille location table 28 in the location-information management unit 7A, and FIG. 12 is an explanatory diagram briefly representing types of the grille 104.

The grille location table 28 represented in FIG. 11 manages XY coordinates 28B indicating a coordinate location of the grille 104 arranged in the spatial layout 100 and a type 28C indicating a type of the grille 104 with each grille number 28A for identifying the grille 104 arranged in the spatial layout 100. The type of the grille 104 includes, as represented in FIG. 12, a type with a round-hall type opening 104B and a type with a square-hall type opening 104C each provided in an air supply surface. Moreover, for example, the same round-hall type includes a plurality of types with various gauges of the opening 104B although they are not depicted.

The device-feature management unit 8A represented in FIG. 2 includes an air-conditioning feature table 31 for managing device features for each type of the air-conditioning devices 103, a rack feature table 32 for managing device features for each type of the rack devices 102, and an IT-device feature table 33 for managing device features with each IT number for identifying the IT-device 101.

The device-feature management unit 8A further includes a distribution-board feature table 34 for managing device features with each distribution board number for identifying the distribution board 105 and a grille feature table 35 for managing device features for each type of the grilles 104.

FIG. 13 is an explanatory diagram briefly representing a table content of the air-conditioning feature table 31 in the device-feature management unit 8A.

The air-conditioning feature table 31 represented in FIG. 13 manages, for each type 31A indicating a type of the air-conditioning device 103, a cooling amount 31B and an air-blowing amount 31C which indicate cooling performance of the air-conditioning device 103, an air-blowing direction 31D indicating an air-blowing direction of the air-conditioning device 103, dimensions 31E indicating overall dimensions of the air-conditioning device 103, and a heat generation amount 31F of the air-conditioning device 103.

FIG. 14 is an explanatory diagram briefly representing a table content of the rack feature table 32 in the device-feature management unit 8A.

The rack feature table 32 represented in FIG. 14 manages dimensions 32B indicating overall dimensions of the rack device 102 for each type 32A indicating a type of the rack device 102.

FIG. 15 is an explanatory diagram briefly representing a table content of the IT-device feature table 33 in the device-feature management unit 8A.

The IT-device feature table 33 represented in FIG. 15 manages a heat generation amount 33B, a required air volume 33C, occupancy 33D, and electricity use 33E of the IT-device 101 with each IT number 33A for identifying the IT-device 101. As for the heat generation amount 33B, the required air volume 33C, and the electricity use 33E or the like, catalogue values of the IT-device 101 are input to be registered and managed, however, actual measured values thereof may be reflected in their registration and management.

Figure 16:
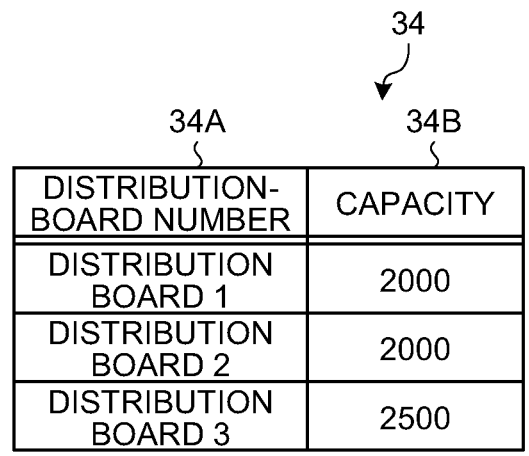
FIG. 16 is an explanatory diagram briefly representing a table content of a distribution-board feature table in the device-feature management unit.

FIG. 16 is an explanatory diagram briefly representing a table content of the distribution-board feature table 34 in the device-feature management unit 8A.

The distribution-board feature table 34 represented in FIG. 16 manages power capacity 34B of the distribution board 105 with each distribution board number 34A for identifying the distribution board 105.

Figure 17:
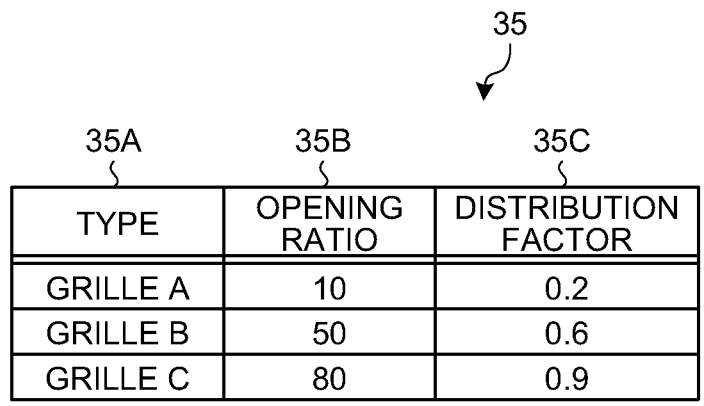
FIG. 17 is an explanatory diagram briefly representing a table content of a grille feature table in the device-feature management unit.

FIG. 17 is an explanatory diagram briefly representing a table content of the grille feature table 35 in the device-feature management unit 8A.

The grille feature table 35 represented in FIG. 17 manages an opening ratio 35B and a distribution factor 35C of the opening of the grille 104 for each type 35A indicating a type of the grille 104.

Figure 18:
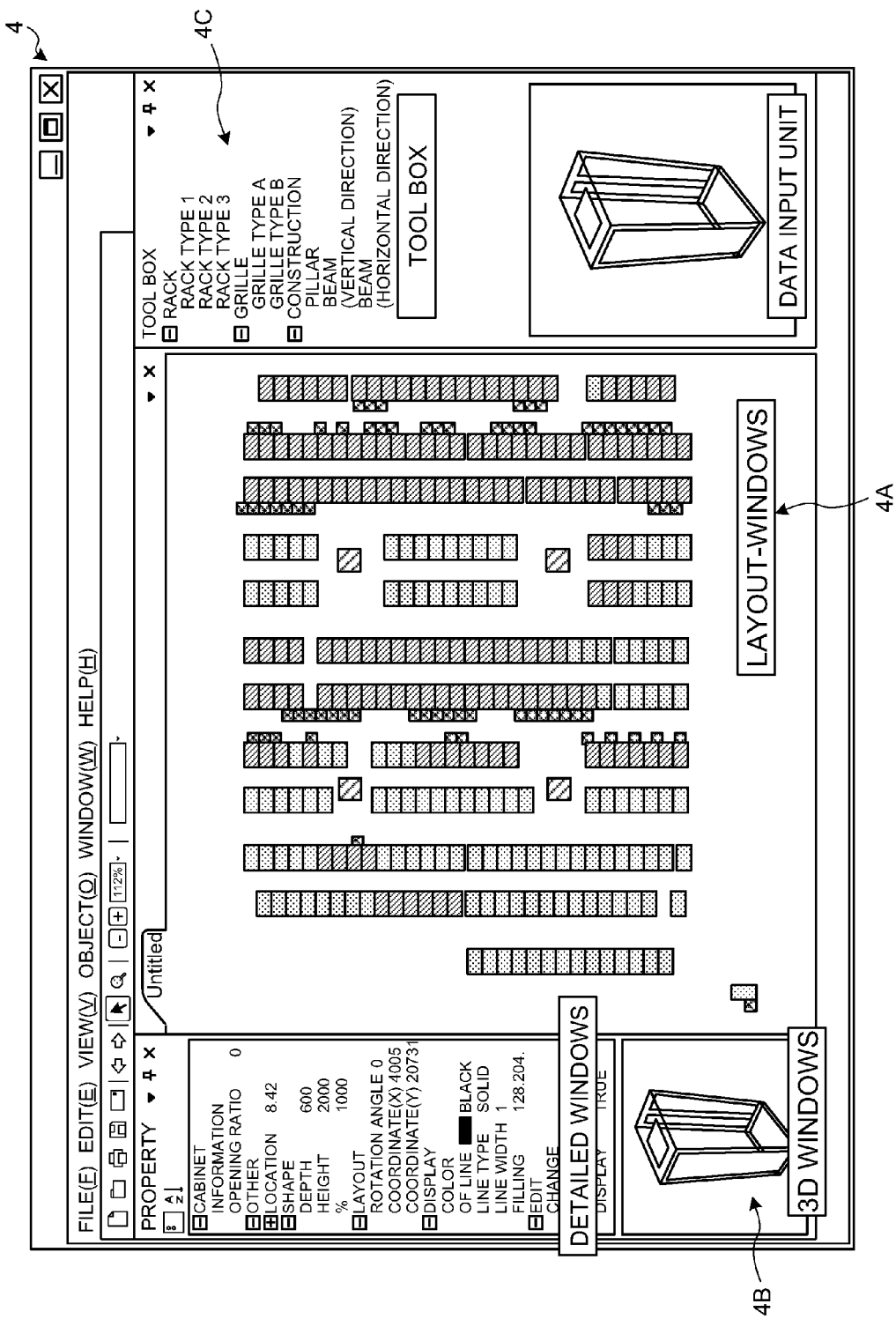
FIG. 18 is an explanatory diagram briefly illustrating a screen content of the monitor unit.

FIG. 18 is an explanatory diagram briefly illustrating a screen content of the monitor unit 4.

The monitor unit 4 represented in FIG. 18 displays thereon spatial layout-windows 4A for displaying the spatial layout 100, 3D windows 4B for three-dimensionally displaying devices arranged in the spatial layout 100, and tool box windows 4C for managing the devices and the like managed by the device management unit 6.

The 3D windows 4B is a screen used to display, for example, the IT-devices 101 mounted in the rack device 102 along the Z coordinate.

The control unit 5 arranges, through the data input unit 3, devices such as the IT-device 101, the rack device 102, the air-conditioning device 103, the grille 104, and the distribution board 105 and also arranges the pillar 107 on the XYZ coordinates of the spatial layout 100 during screen display on the monitor unit 4, from the tool box windows 4C in a drag-and-drop manner, and registers the location information of the IT-device 101, the rack device 102, the air-conditioning device 103, the grille 104, the distribution board 105, and the pillar 107 in the XYZ coordinates in the location-information management unit 7A for management thereof.

When detecting an instruction to guide a layout of various devices through the data input unit 3, the guide-information generation unit 9A displays a device layout guide of devices allowing for location information and device features of the devices on the screen of the monitor unit 4 based on the location information and the device features of the devices managed by the location-information management unit 7A and the device-feature management unit 8A respectively.

The device layout guide includes a distribution-board layout guide for guiding a power-supply destination layout of the distribution boards 105 in the spatial layout 100, a distribution-board power-balance guide for guiding an electric-energy balance between the distribution board 105 and the power-supply destination in the spatial layout 100, and a cooling-balance guide for guiding a cooling balance in the spatial layout 100.

The device layout guide also includes a heat generation amount guide for guiding a heat generation amount for each IT-device 101 and a heat generation amount for each rack device 102 arranged in the spatial layout 100, and a cooling performance guide for guiding a cooling performance range of the air-conditioning device 103 arranged in the spatial layout 100.

The device layout guide further includes a grille installation guide for guiding whether the grille 104 needs to be installed for each rack device 102 in the cooling performance range, and a sufficiency-of-grille-air-blowing-amount guide for guiding a sufficiency of the amount of air blowing for each grille 104 in the cooling performance range.

Next, an operation of the device-layout guiding apparatus 1A according to the second embodiment will be explained below. FIG. 19 is an explanatory diagram of a processing operation in the control unit 5 related to a device layout process.

In FIG. 19, the control unit 5 of the device-layout guiding apparatus 1A develops, through the data input unit 3, a spatial layout 100 with a floor number of a desired floor on the screen of the monitor unit 4 from the layout management table 21 of the location-information management unit 7A (Step S11).

The control unit 5 arranges, through the data input unit 3, a layout inhibited area (pillar 107) in the spatial layout 100 during screen display on the monitor unit 4 in a drag-and-drop manner (Step S12). When the pillar 107 is arranged in the spatial layout 100, the control unit 5 registers the pillar number 22A, the XY coordinates 22B, and the dimensions 22C of the pillar 107 in the pillar location table 22 represented in FIG. 5 for management thereof.

The control unit 5 further arranges, through the data input unit 3, the distribution board 105 in the spatial layout 100 in a drag-and-drop manner (Step S13). When the distribution board 105 is arranged in the spatial layout 100, the control unit 5 registers the distribution board number 26A and the XY coordinates 26B of the distribution board 105 in the distribution-board location table 26 represented in FIG. 9 for management thereof.

The control unit 5 further arranges, through the data input unit 3, the air-conditioning device 103 in the spatial layout 100 in a drag-and-drop manner (Step S14). When the air-conditioning device 103 is arranged in the spatial layout 100, the control unit 5 registers the air-conditioning number 23A, the XY coordinates 23B, and the type 23C of the air-conditioning device 103 in the air-conditioning location table 23 represented in FIG. 6 for management thereof.

The control unit 5 also arranges, through the data input unit 3, the rack device 102 in the spatial layout 100 in a drag-and-drop manner (Step S15). When the rack device 102 is arranged in the spatial layout 100, the control unit 5 registers the rack number 24A, the XY coordinates 24B, and the type 24C of the rack device 102 in the rack location table 24 represented in FIG. 7 for management thereof.

Moreover, the control unit 5 mounts and arranges, through the data input unit 3, the IT-device 101 in the rack device 102 on the spatial layout 100 in a drag-and-drop manner (Step S16). When the IT-device 101 is mounted and arranged in the rack device 102 on the spatial layout 100, the control unit 5 registers the rack number 25A of the rack device 102, the IT number 25B, and the Z coordinate 25C of the mounting location in the rack unit table 25 represented in FIG. 8 for management thereof.

The control unit 5 further arranges, through the data input unit 3, the grille 104 in the spatial layout 100 in a drag-and-drop manner (Step S17). When the grille 104 is arranged in the spatial layout 100, the control unit 5 registers the grille number 28A, the XY coordinates 28B, and the type 28C thereof in the grille location table 28 represented in FIG. 11 for management thereof.

In addition, the control unit 5 specifies the IT-device 101 mounted in the rack device 102 as a power-supply destination of the breaker in the distribution board 105 on the spatial layout 100. When the IT-device 101 is specified as the power-supply destination of the breaker, the control unit 5 registers the distribution board number 27A of the distribution board 105, the breaker number 27B of the breaker, the power capacity 27C, the rack number 27D of the rack device 102 with the IT-device 101 as the power-supply destination, and the Z coordinate 27E of the mounting location, in the distribution-board unit table 27 represented in FIG. 10 for management thereof.

The control unit 5 arranges the devices in desired locations on the spatial layout 100 through the processes at Steps S11 to S17, to thereby register the location information of these devices in the location-information management unit 7A for management thereof.

The control unit 5 displays the layout of the various devices in the spatial layout 100 during screen display on the monitor unit 4 based on the location information of the devices registered in and managed by the location-information management unit 7A, and also guides and displays the device layout guide of the devices allowing for the device features of the devices on the monitor unit 4 based on the device features of the devices registered in and managed by the device-feature management unit 8A.

Next, an operation related to the device layout guide of the device-layout guiding apparatus 1A will be explained below. FIG. 20 is an explanatory diagram briefly illustrating a guide content of distribution-board layout guide.

The distribution-board layout guide represented in FIG. 20 is used to guide a power-supply destination layout of the distribution boards 105 in the spatial layout 100 breaker by breaker.

When detecting an operation of specifying the distribution board 105 as a guiding target on the spatial layout 100 and the breaker number of the distribution board 105 through the data input unit 3, the guide-information generation unit 9A of the control unit 5 recognizes the XY coordinates 26B of the distribution board 105 and reads the distribution board number 26A of the distribution board 105 corresponding to the XY coordinates 26B from the distribution-board location table 26 in FIG. 9.

Furthermore, the guide-information generation unit 9A reads the distribution board number 26A (27A) of the read distribution board 105, the power capacity 27C corresponding to the specified breaker number 27B, the rack number 27D, and the mounting location (Z coordinate) 27E from the distribution-board unit table 27 in FIG. 10.

Then, when the breaker number of the specified distribution board 105 is specified, the guide-information generation unit 9A generates a distribution-board layout guide based on the power capacity 27C, the rack number 27D, and the mounting location (Z coordinate) 27E corresponding to the specified breaker number 27B of the distribution board 105, and guides and displays the generated distribution-board layout guide on the monitor unit 4 as represented in FIG. 20.

As a result, the user of the device-layout guiding apparatus 1A, as represented in FIG. 20, can recognize a power supply amount for each breaker of the distribution board 105, and can also recognize the rack device 102 as a power-supply destination and the mounting location of the IT-device 101 mounted in the rack device 102 based on the distribution-board layout guide.

Figure 21:
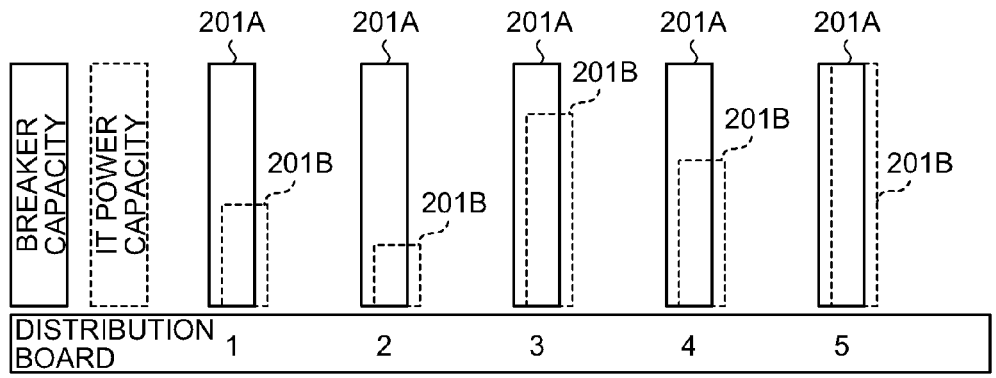
FIG. 21 is an explanatory diagram briefly illustrating a guide content of a distribution-board power-balance guide.

FIG. 21 is an explanatory diagram briefly illustrating a guide content of a distribution-board power-balance guide.

The distribution-board power-balance guide as represented in FIG. 21 is used to guide an electric-energy balance between the distribution board 105 and the IT-device 101 as the power-supply destination in the spatial layout 100 breaker by breaker.

When detecting an operation of specifying the distribution board 105 as a guiding target on the spatial layout 100 through the data input unit 3, the guide-information generation unit 9A recognizes the XY coordinates 26B of the distribution board 105 and reads the distribution board number 26A of the distribution board 105 corresponding to the XY coordinates 26B from the distribution-board location table 26 in FIG. 9.

The guide-information generation unit 9A further reads corresponding power capacity 27C, rack number 27D, and mounting location (Z coordinate) 27E for each breaker number 27B corresponding to the distribution board number 26A (27A) of the read distribution board 105, from the distribution-board unit table 27 in FIG. 10.

Furthermore, the guide-information generation unit 9A reads the IT number 25B of the IT-device 101 corresponding to the rack number 27D and the mounting location (Z coordinate) 27E for each breaker number 27B, from the rack unit table 25 in FIG. 8. That is, the guide-information generation unit 9A recognizes the IT-device 101 as a power-supply destination for each breaker of the distribution board 105 as a guiding target.

The guide-information generation unit 9A further reads the electricity use 33E corresponding to the IT number 25B (33A) of the IT-device 101 as the power-supply destination, from the IT-device feature table 33 in FIG. 15.

The guide-information generation unit 9A further reads the electricity use 33E of the IT-device 101 as the power-supply destination for each breaker, and calculates a sum of electricity use 33E of the IT-devices 101 as power-supply destinations. It should be noted that if there is a plurality of IT-devices 101 as power-supply destinations of breakers, the sum of the electricity use 33E of the IT-devices 101 being the power-supply destinations is set as IT power capacity.

The guide-information generation unit 9A compares a bar graph 201A as the power capacity 27C with a bar graph 201B as a sum of IT power capacities of the power-supply destinations, as represented in FIG. 21, breaker by breaker based on the power capacity 27C for each breaker of the distribution board 105 as a guiding target and the sum of the IT power capacities of the IT-devices 101 as the power-supply destinations, and guides and displays the distribution-board power-balance guide including the results of comparisons on the monitor unit 4.

As a result, the user of the device-layout guiding apparatus 1A, as represented in FIG. 21, can recognize each power balance in a power capacity between each breaker in the distribution board 105 as a guiding target and a power-supply destination, based on the distribution-board power-balance layout guide.

Figure 22:
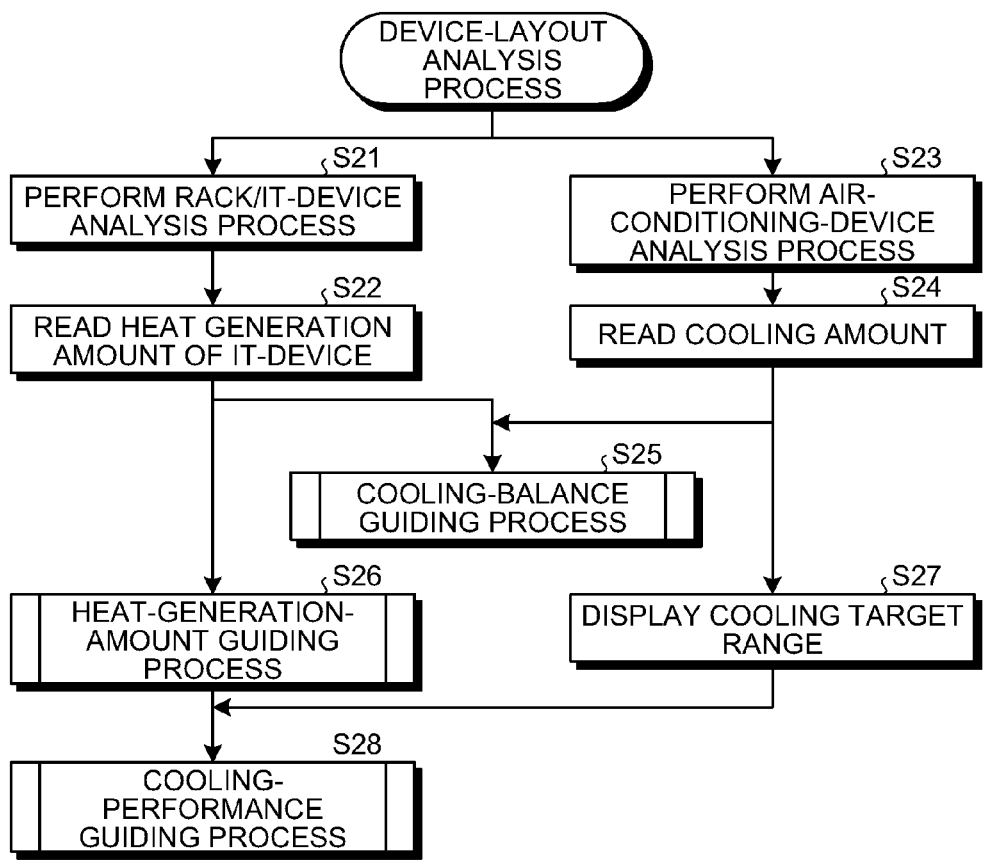
FIG. 22 is a flowchart briefly representing a part of a processing operation in a guide-information generation unit related to a device-layout analysis process.

Next, a device-layout analysis process in the device-layout guiding apparatus 1A will be explained below. FIG. 22 is a flowchart briefly representing a part of a processing operation in the guide-information generation unit 9A related to the device-layout analysis process.

The device-layout analysis process represented in FIG. 22 is a process of analyzing device features of the air-conditioning device 103 and the IT-device 101 arranged in the spatial layout 100 in order to execute the cooling balance guide, the heat-generation-amount guide, and the cooling performance guide and the like.

The guide-information generation unit 9A starts the device-layout analysis process, and executes the analysis process for all the rack devices 102 and all the IT-devices 101 arranged in the spatial layout 100 (Step S21).

As for the analysis process for all the rack devices 102 and all the IT-devices 101, when the XY coordinates 24B of each rack device 102 on the spatial layout 100 are recognized, the guide-information generation unit 9A reads a rack number 24A corresponding to the XY coordinates 24B of each rack device 102 from the rack location table 24 in FIG. 7. Furthermore, when detecting the rack number 24A of each rack device 102, the guide-information generation unit 9A reads an IT number 25B corresponding to the rack number 24A (25A) from the rack unit table 25 in FIG. 8. As a result, the guide-information generation unit 9A recognizes the IT number 25B of the IT-device 101 mounted in each of the rack devices 102.

When recognizing the IT number 25B of each of the IT-devices 101 mounted in each of the rack devices 102, the guide-information generation unit 9A reads a heat generation amount 33B of the IT-device 101 corresponding to the IT number 25B (33A) from the IT-device feature table 33 in FIG. 15 (Step S22). As a result, the guide-information generation unit 9A can recognize the heat generation amounts of all the IT-devices 101 mounted in all the rack devices 102 on the spatial layout 100.

Furthermore, the guide-information generation unit 9A starts the device-layout analysis process and executes the analysis process for all the air-conditioning devices 103 on the spatial layout 100 in parallel to the processes at Step S21 and Step S22 (Step S23).

As for the analysis process for all the air-conditioning devices 103, when the XY coordinates 23B of each of the air-conditioning devices 103 on the spatial layout 100 are recognized, the guide-information generation unit 9A reads an air-conditioning number 23A and a type 23C corresponding to the XY coordinates 23B of each of the air-conditioning devices 103 from the air-conditioning location table 23 in FIG. 6. Furthermore, the guide-information generation unit 9A reads a cooling amount 31B, an air-blowing direction 31D, and a heat generation amount 31F corresponding to the type 23C (31A) of each of the air-conditioning devices 103 from the air-conditioning feature table 31 in FIG. 13 (Step S24).

The guide-information generation unit 9A executes a cooling-balance guiding process explained later (see FIG. 23), based on the heat generation amounts of all the IT-devices 101 and the heat generation amounts of all the air-conditioning devices 103 acquired at Step S22 and Step S24 respectively, and based on the cooling amounts of all the air-conditioning devices 103 acquired at Step S24 (Step S25).

Furthermore, the guide-information generation unit 9A executes a heat-generation-amount guiding process explained later (see FIG. 25), based on the heat generation amount of the IT-device 101 mounted in each of the rack devices 102 acquired at Step S22 (Step S26).

Moreover, the guide-information generation unit 9A displays a cooling target range of each of the air-conditioning devices 103 on the screen of the spatial layout 100 based on the XY coordinates 23B of each of the air-conditioning devices 103 acquired at Step S23, and based on the cooling amount 31B and the air-blowing direction 31D of each of the air-conditioning devices 103 acquired at Step S24 (Step S27).

The guide-information generation unit 9A further executes the cooling-performance guiding process (see FIG. 28), based on the cooling target range of each of the air-conditioning devices 103 acquired at Step S27 and the heat generation amounts of all the IT-devices 101 mounted in each of the rack devices 102 acquired at Step S26 (Step S28).

Figure 23:
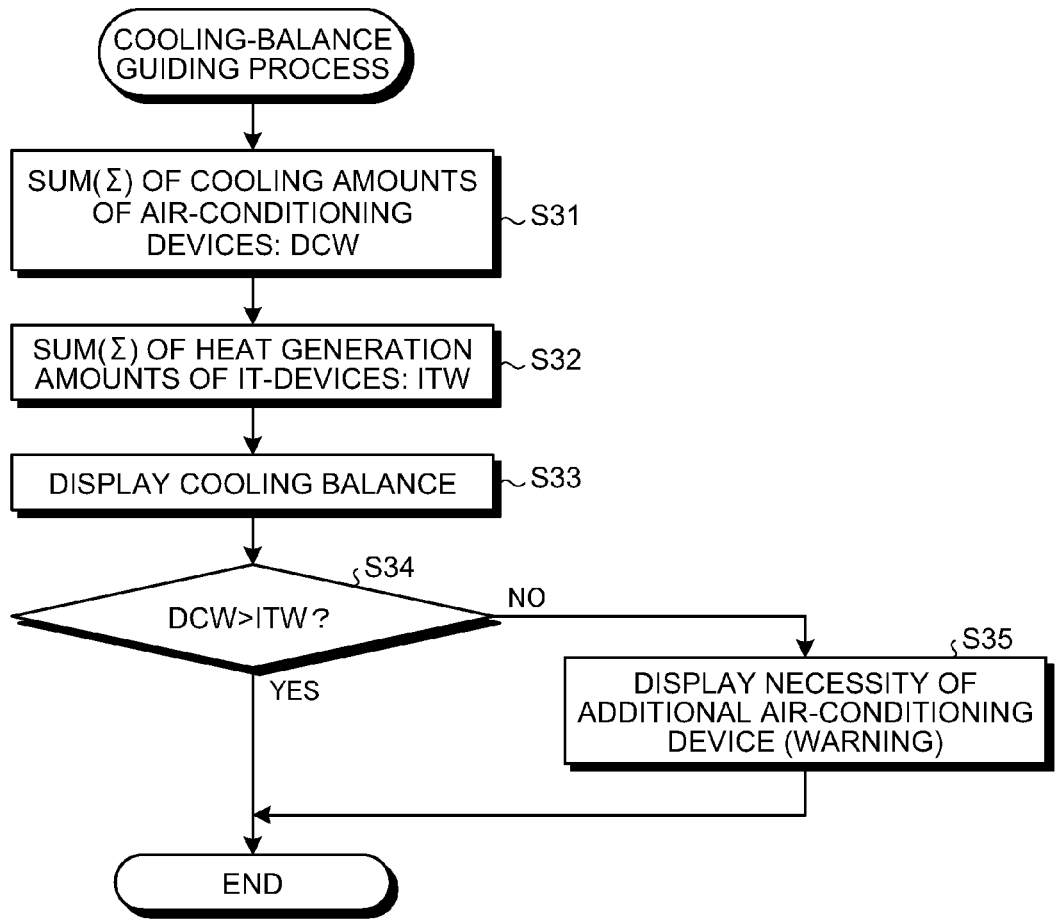
FIG. 23 is a flowchart of a processing operation in the guide-information generation unit related to a cooling-balance guiding process.
Figure 24:
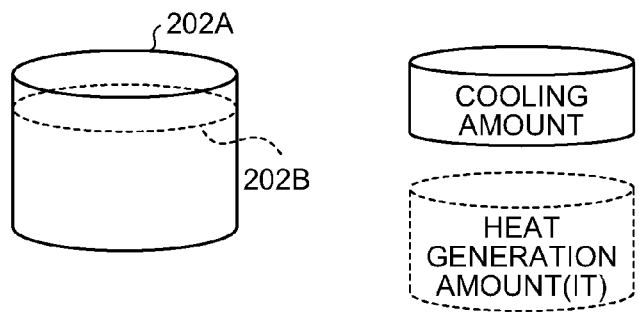
FIG. 24 is an explanatory diagram briefly illustrating a guide content of the cooling-balance guiding process.

The cooling-balance guiding process performed at Step S25 in FIG. 22 will be explained below. FIG. 23 is a flowchart of a processing operation in the guide-information generation unit 9A related to the cooling-balance guiding process, and FIG. 24 is an explanatory diagram briefly illustrating a guide content of the cooling-balance guiding process.

The cooling-balance guiding process represented in FIG. 23 is a process of guiding and displaying a balance of cooling amounts, or a cooling balance, of all the air-conditioning devices 103 arranged in the spatial layout 100 with respect to the heat generation amounts of all the IT-devices 101 and of all the air-conditioning devices 103 arranged in the spatial layout 100, on the monitor unit 4.

In FIG. 23, the guide-information generation unit 9A starts the cooling-balance guiding process and calculates DCW as a sum of cooling amounts of all the air-conditioning devices 103 in the spatial layout 100 (Step S31). It should be noted that the cooling amounts of all the air-conditioning devices 103 are acquired at Step S24 in FIG. 22.

Furthermore, the guide-information generation unit 9A calculates ITW as a sum of heat generation amounts of all the IT-devices 101 and of heat generation amounts of all the air-conditioning devices 103 in the spatial layout 100 (Step S32). It should be noted that the heat generation amounts of all the IT-devices 101 and of all the air-conditioning devices 103 are acquired at Step S22 and Step S24 in FIG. 22 respectively.

The guide-information generation unit 9A compares DCW as the sum of all the cooling amounts of all the air-conditioning devices 103 at Step S31 with ITW as the sum of all the heat generation amounts of all the IT-devices 101 and of all the air-conditioning devices 103 at Step S32, and guides and displays the result of comparison as the cooling balance on the monitor unit 4 (Step S33). It should be noted that in the cooling balance, as represented in FIG. 24, DCW as the sum of all the cooling amounts is indicated by a solid line 202A and ITW as the sum of all the heat generation amounts is indicated by a dotted line 202B.

As a result, the user of the device-layout guiding apparatus 1A can recognize the cooling balance between all the cooling amounts and all the heat generation amounts in the spatial layout 100 based on the cooling balance during screen display on the monitor unit 4.

Moreover, the guide-information generation unit 9A determines whether DCW as the sum of all the cooling amounts of all the air-conditioning devices 103 at Step S31 is greater than ITW as the sum of the heat generation amounts of all the IT-devices 101 and of all the air-conditioning devices 103 at Step S32 (Step S34).

If the DCW as the sum of all the cooling amounts is greater than the ITW as the sum of all the heat generation amounts (Yes at Step S34), the guide-information generation unit 9A ends the processing operation represented in FIG. 23.

If the DCW as the sum of all the cooling amounts is not greater than the ITW as the sum of all the heat generation amounts (No at Step S34), the guide-information generation unit 9A determines that the air-conditioning devices 103 arranged in the spatial layout 100 are not many enough, and thus, displays necessity of an additional air-conditioning device for requiring addition of the air-conditioning device 103 on the screen of the monitor unit 4 (Step S35), and ends the processing operation represented in FIG. 23.

As a result, the user of the device-layout guiding apparatus 1A can recognize the necessity of addition of the air-conditioning device 103 to the spatial layout 100 based on the necessity of the additional air-conditioning device displayed on the monitor unit 4.

Figure 25:
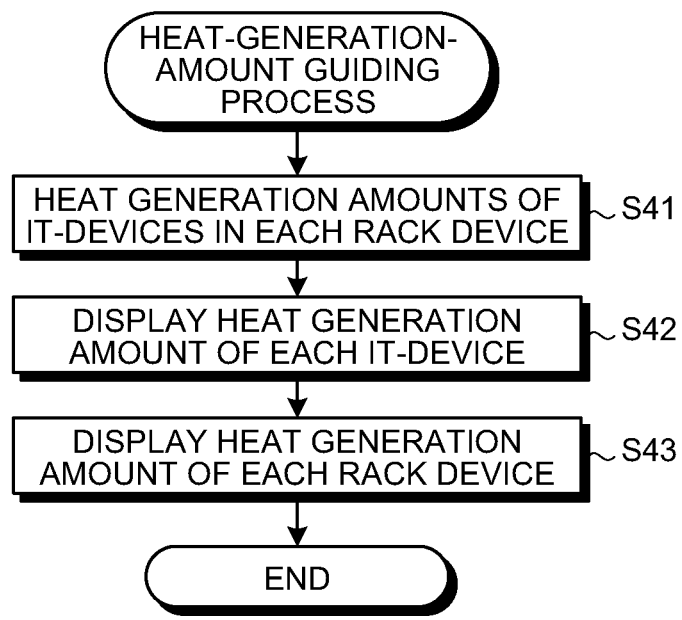
FIG. 25 is a flowchart of a processing operation in the guide-information generation unit related to a heat-generation-amount guiding process.
Figure 26:
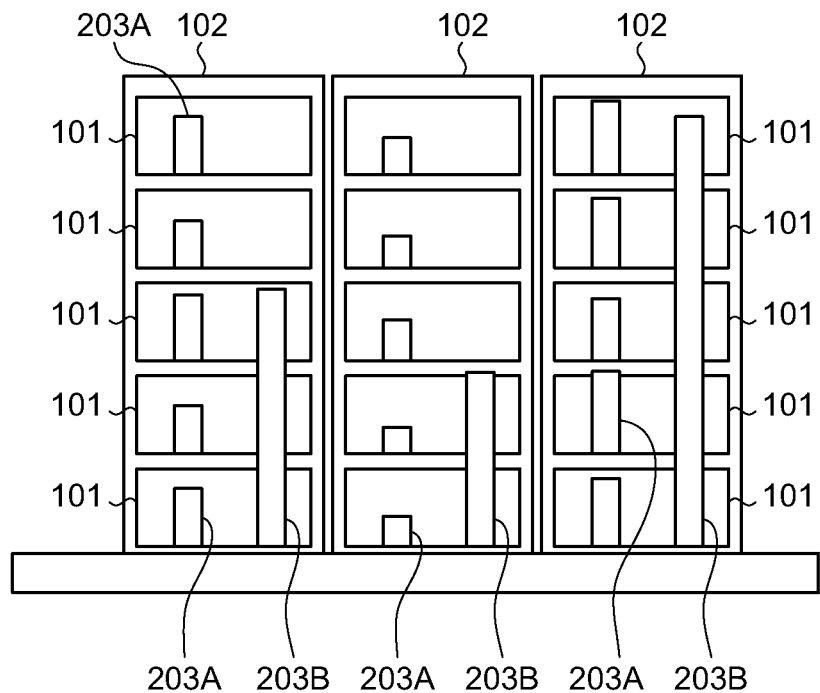
FIG. 26 is an explanatory diagram briefly illustrating a guide content on 3D windows related to the heat-generation-amount guiding process.
Figure 27:
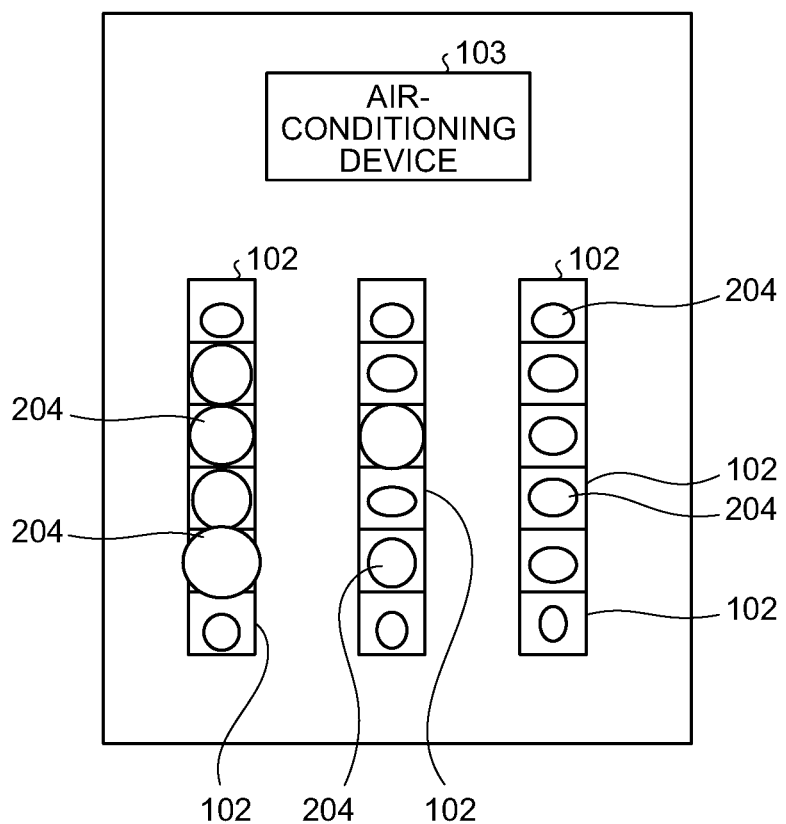
FIG. 27 is an explanatory diagram briefly illustrating a guide content on spatial layout windows related to the heat-generation-amount guiding process.

Next, the heat-generation-amount guiding process at Step S26 in FIG. 22 will be explained below. FIG. 25 is a flowchart of a processing operation in the guide-information generation unit 9A related to the heat-generation-amount guiding process, FIG. 26 is an explanatory diagram briefly illustrating a guide content on the 3D windows 4B related to the heat-generation-amount guiding process, and FIG. 27 is an explanatory diagram briefly illustrating a guide content on the spatial layout-windows 4A related to the heat-generation-amount guiding process.

The heat-generation-amount guiding process represented in FIG. 25 is a process for guiding and displaying a heat generation amount of each IT-device 101 and a heat generation amount of each rack device 102 arranged in the spatial layout 100 on the monitor unit 4.

The guide-information generation unit 9A represented in FIG. 25 acquires a heat generation amount of each of the IT-devices 101 mounted in each rack device 102 in the spatial layout 100 (Step S41). It should be noted that the heat generation amount of each of the IT-devices 101 mounted in each rack device 102 is acquired at Step S22 in FIG. 22.

The guide-information generation unit 9A guides and displays the heat generation amount of each IT-device 101 mounted in each of the rack devices 102 as a bar graph (Step S42). It should be noted that the guide-information generation unit 9A displays the rack devices 102 on the 3D windows 4B of the monitor unit 4 as represented in FIG. 26, and guides and displays the heat generation amount of each of the IT-devices 101 mounted in each of the rack devices 102 as a bar graph 203A.

As a result, the user of the device-layout guiding apparatus 1A can recognize the heat generation amount of each of the IT-devices 101 mounted in the rack device 102 by the bar graph 203A displayed on the 3D windows 4B.

Furthermore, the guide-information generation unit 9A guides and displays the sum of the heat generation amounts of all the IT-devices 101 mounted in each of the rack devices 102 as the bar graph (Step S43), and ends the processing operation represented in FIG. 25. It should be noted that, as represented in FIG. 26, the guide-information generation unit 9A guides and displays the sum of the heat generation amounts of all the IT-devices 101 mounted in the rack device 102 during screen display as bar graph 203B on the 3D windows 4B.

As a result, the user of the device-layout guiding apparatus 1A can recognize the heat generation amount of each of the rack devices 102 by the bar graph 203B displayed on the 3D windows 4B.

When the heat generation amount of each of the rack devices 102 is displayed on the 3D windows 4B, the guide-information generation unit 9A displays the heat generation amount of each of the rack devices 102 as the bar graph 203B thereon. However, when it is displayed on the two-dimensional spatial layout-windows 4A, as represented in FIG. 27, the heat generation amount of each of the rack devices 102 is expressed by a circle mark 204, and the magnitude of the heat generation amount is expressed by changing the diameter of the circle mark 204. As a result, the user of the device-layout guiding apparatus 1A can recognize the heat generation amount of each of the rack devices 102 as the size of the circle mark 204 in the rack device 102 displayed on the spatial layout-windows 4A.

Figure 28:
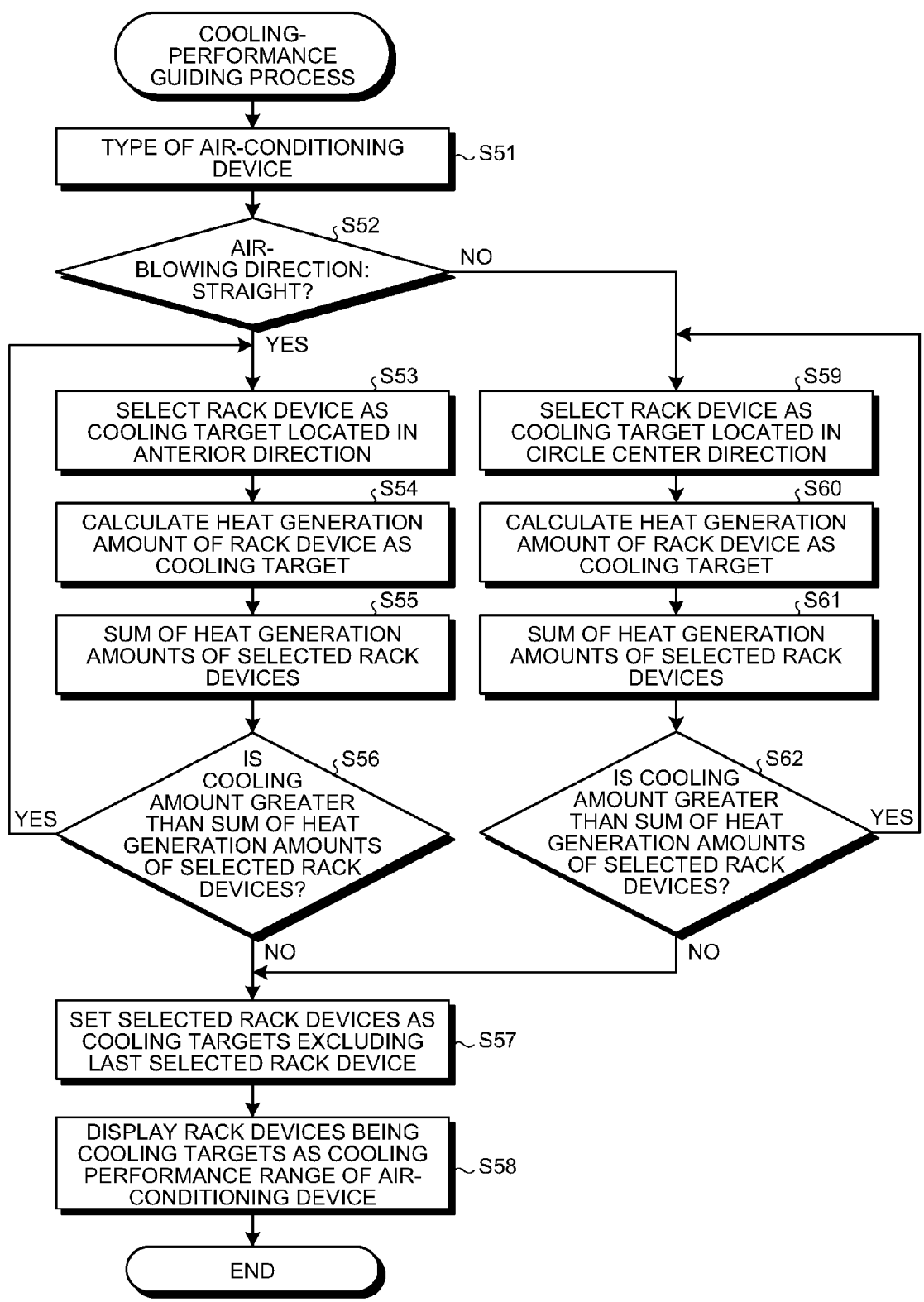
FIG. 28 is a flowchart of a processing operation in the guide-information generation unit related to a cooling-performance guiding process.
Figure 29:
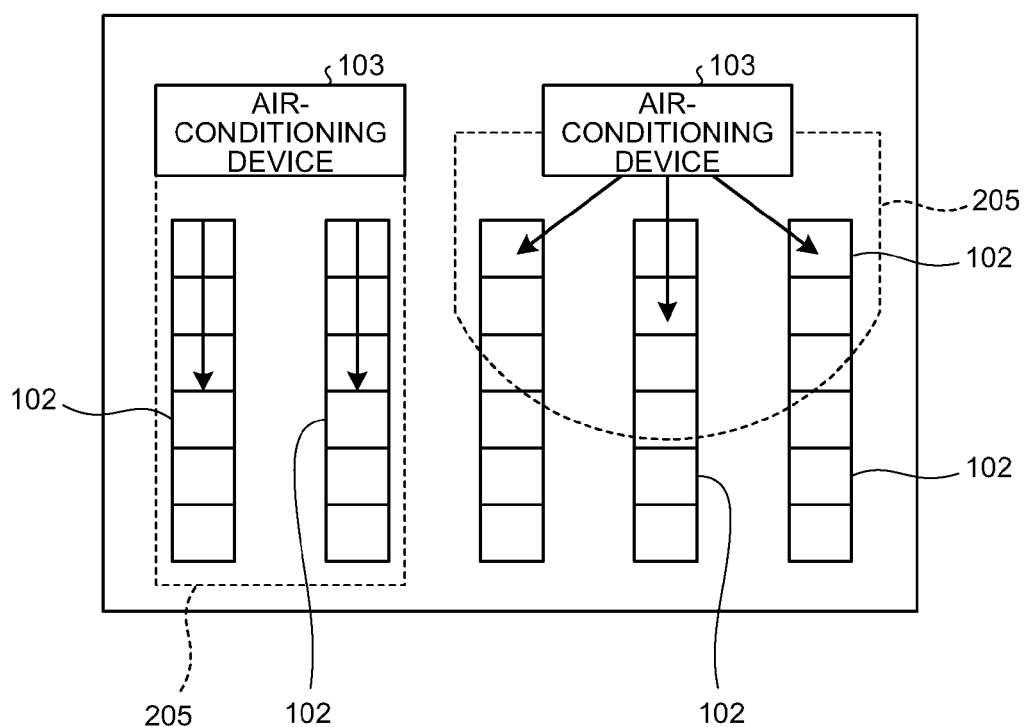
FIG. 29 is an explanatory diagram briefly illustrating a guide content related to the cooling-performance guiding process.

Next, the cooling-performance guiding process at Step S28 in FIG. 22 will be explained below. FIG. 28 is a flowchart of a processing operation in the guide-information generation unit 9A related to the cooling-performance guiding process, and FIG. 29 is an explanatory diagram briefly illustrating a guide content related to the cooling-performance guiding process.

The cooling-performance guiding process represented in FIG. 28 is a process for guiding and displaying a cooling performance range of the air-conditioning device 103 arranged in the spatial layout 100 on the spatial layout-windows 4A.

The guide-information generation unit 9A identifies a type of the air-conditioning device 103 arranged in the spatial layout 100 (Step S51). It should be noted that when identifying the type of the air-conditioning device 103, the guide-information generation unit 9A acquires the cooling amount 31B, the air-blowing amount 31C, and the air-blowing direction 31D corresponding to the type 31A of the air-conditioning device 103 from the air-conditioning feature table 31 in FIG. 13.

The guide-information generation unit 9A determines whether the air-blowing direction of the air-conditioning device 103 is straight (Step S52). The guide-information generation unit 9A, if the air-blowing direction of the air-conditioning device 103 is straight (Yes at Step S52), selects a rack device 102 as a cooling target located in an anterior direction with respect to the straight direction of the air-conditioning device 103 (Step S53). It should be noted that the guide-information generation unit 9A selects the rack device 102 as a cooling target located in the anterior direction with respect to the straight direction of the air-conditioning device 103 based on the XY coordinates of the air-conditioning device 103.

The guide-information generation unit 9A selects the rack device 102 as the cooling target, calculates a heat generation amount of each of the IT-devices 101 mounted in the rack device 102 (Step S54), and calculates a sum of heat generation amounts of all the selected rack devices 102 (Step S55).

The guide-information generation unit 9A determines whether the cooling amount of the air-conditioning device 103 is greater than the sum of heat generation amounts of the selected rack devices 102 (Step S56).

If the cooling amount of the air-conditioning device 103 is greater than the sum of the heat generation amounts of the selected rack devices 102 (Yes at Step S56), the guide-information generation unit 9A moves to Step S53 to select another rack device 102 from among the rack devices 102 as cooling targets.

Moreover, if the cooling amount of the air-conditioning device 103 is not greater than the sum of the heat generation amounts of the selected rack devices 102 (No at Step S56), the guide-information generation unit 9A determines that the air-conditioning device 103 exceeds its cooling performance, and sets the selected rack devices 102, excluding the last selected rack device 102, as the cooling targets of the air-conditioning device 103 (Step S57).

Furthermore, when the selected rack devices 102 are set as the cooling targets of the air-conditioning device 103, the guide-information generation unit 9A surrounds the rack devices 102 being the cooling targets as a cooling performance range 205 of the air-conditioning device 103 as represented in FIG. 29, guides and displays the surrounded rack devices 102 on the screen of the monitor unit 4 (Step S58), and ends the processing operation represented in FIG. 28. As a result, the user of the device-layout guiding apparatus 1A can recognize the cooling performance range of the air-conditioning device 103 by the cooling performance range 205 during screen display.

Moreover, when the air-blowing direction of the air-conditioning device 103 is not straight (No at Step S52), the guide-information generation unit 9A determines that the air-blowing direction is a circle center direction, and selects the rack devices 102 as the cooling targets located in the circle center direction of the air-conditioning device 103 (Step S59). It should be noted that the guide-information generation unit 9A selects the rack devices 102 as the cooling targets located in the anterior direction with respect to the circle center direction of the air-conditioning device 103.

When the rack devices 102 as the cooling targets are selected, the guide-information generation unit 9A calculates the heat generation amount of each of the IT-devices 101 mounted in the rack device 102 (Step S60), and calculates a sum of the heat generation amounts of all the selected rack devices 102 (Step S61).

The guide-information generation unit 9A determines whether the cooling amount of the air-conditioning device 103 is greater than the sum of the heat generation amounts of the selected rack devices 102 (Step S62).

When the cooling amount of the air-conditioning device 103 is greater than the sum of the heat generation amounts of the selected rack devices 102 (Yes at Step S62), the guide-information generation unit 9A moves to Step S59 to select another rack device 102 from among the rack devices 102 as cooling targets.

When the cooling amount of the air-conditioning device 103 is not greater than the sum of the heat generation amounts of the selected rack devices 102 (No at Step S62), the guide-information generation unit 9A determines that the air-conditioning device 103 exceeds its cooling performance, and moves to Step S57 to set the selected rack devices 102, excluding the last selected rack device 102, as the cooling targets of the air-conditioning device 103.

Figure 30:
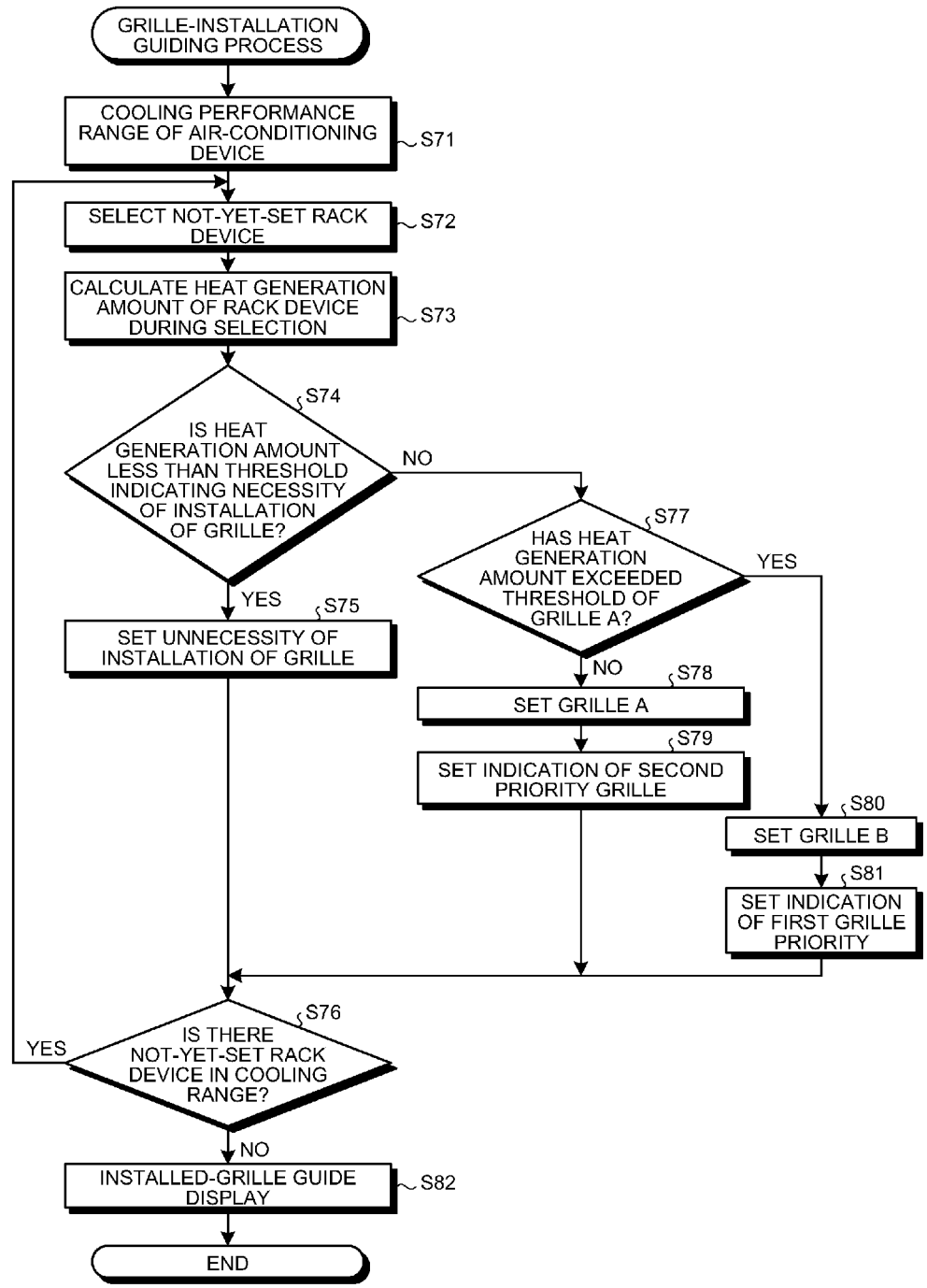
FIG. 30 is a flowchart of a processing operation in the guide-information generation unit related to a grille-installation guiding process.
Figure 31:
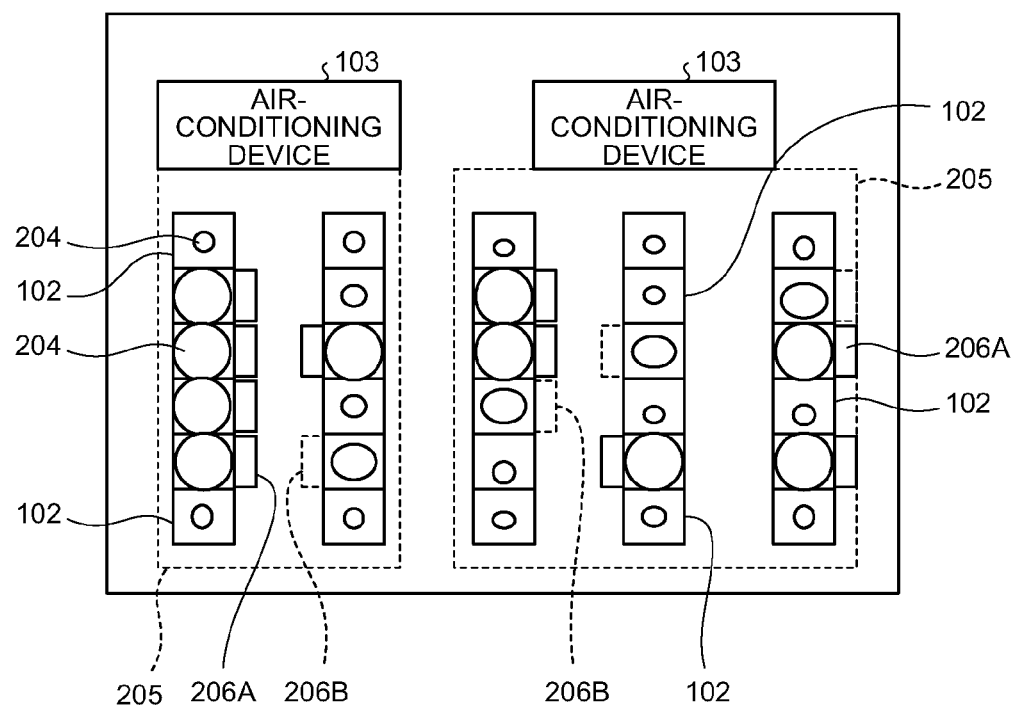
FIG. 31 is an explanatory diagram briefly illustrating a guide content related to the grille-installation guiding process.

Next, a grille-installation guiding process will be explained below. FIG. 30 is a flowchart of a processing operation in the guide-information generation unit 9A related to a grille-installation guiding process, and FIG. 31 is an explanatory diagram briefly illustrating a guide content related to the grille-installation guiding process.

The grille-installation guiding process represented in FIG. 30 is a process for guiding and displaying whether the grille needs to be installed in each rack device 102 within the cooling performance range 205 on the spatial layout 100.

When the cooling performance range 205 of the air-conditioning device 103 as a guiding target is detected on the spatial layout 100 (Step S71), the guide-information generation unit 9A selects a not-yet-set rack device 102 within the cooling performance range 205 (Step S72). It should be noted that the not-yet-set rack device 102 corresponds to a rack device 102 in which necessity or unnecessity of installation of the grille 104 is not yet set, among the rack devices within the cooling performance range 205.

When the not-yet-set rack device 102 is selected, the guide-information generation unit 9A calculates a sum of the heat generation amounts of all the IT-devices 101 mounted in the selected rack device 102 (Step S73). When the sum of the heat generation amounts of each of the rack devices 102 is calculated, the guide-information generation unit 9A determines whether the sum of the heat generation amounts is less than a threshold, indicating the necessity of installation of the grille, for requiring installation of the grille 104 (Step S74).

When the sum of the heat generation amounts of each of the rack devices 102 is less than the threshold indicating the necessity of installation of the grille (Yes at Step S74), the guide-information generation unit 9A determines that there is no need to install the grille 104 in the rack device 102, sets the unnecessity of installation of the grille in the rack device 102 (Step S75), and determines whether there is a not-yet-set rack device 102 in the cooling performance range 205 (Step S76).

When there is a not-yet-set rack device 102 in the cooling performance range 205 (Yes at Step S76), the guide-information generation unit 9A moves to Step S72 to select the not-yet-set rack device 102.

When the sum of the heat generation amounts of the rack device 102 is not less than the threshold indicating the necessity of installation of the grille (No at Step S74), the guide-information generation unit 9A determines whether the sum of the heat generation amounts exceeds the threshold of a grille A (Step S77).

When the sum of the heat generation amounts does not exceed the threshold of the grille A (No at Step S77), the guide-information generation unit 9A sets the installation of the grille A in the rack device 102 in order to install the grille 104 of type A (Step S78), sets an indication of a second priority grille (Step S79), and moves to Step S76 to determine whether there is a not-yet-set rack device 102.

When the sum of the heat generation amounts of the rack device 102 exceeds the threshold of the grille A (Yes at Step S77), the guide-information generation unit 9A sets the installation of a grille B in the rack device 102 in order to install the grille 104 of type B of which opening ratio is larger than that of the grille 104 of type A (Step S80), sets an indication of a first priority grille (Step S81), and moves to Step S76 to determine whether there is a not-yet-set rack device 102. It should be noted that the indication of the first priority grille and the indication of the second priority grille correspond to priority orders for requiring installation of the grilles 104, and thus the first priority grille is higher than the other in an installation priority of the grille 104.

If there is no not-yet-set rack device 102 in the cooling performance range 205 (No at Step S76), the guide-information generation unit 9A determines that setting of the necessity or unnecessity of installation of the grille 104 performed on all the rack devices 102 in the cooling performance range 205 of the air-conditioning device 103 is completed, displays an installed-grille guide display including the setting results at Step S75, Step S78, and Step S80 and the setting results of grill priorities at Step S79 and Step S81 on the screen of the monitor unit 4 (Step S82), and ends the processing operation in FIG. 30.

As represented in FIG. 31, in the installed-grille guide display, the heat generation amount of each of the rack devices 102 in the cooling performance range 205 of the air-conditioning device 103 is represented by the circle mark 204, the necessity or unnecessity of installation of the grille 104 in each of the rack devices 102 and the type of the grille 104 if the installation of the grille 104 is necessary are represented, and the installation priority of the grille 104 is also represented. The type of the grille 104 is displayed in such a manner that it is identified by using different colors, and the installation priority of the grille 104 is displayed on the screen in such a manner that the first priority grille is indicated by a solid line 206A and the second priority grille is indicated by a dotted line 206B.

As a result, the user of the device-layout guiding apparatus 1A can recognize the necessity or unnecessity of installation of the grille 104 in each rack device 102, the type by the color of the grille 104, and the installation priority of the grille 104 by the solid line or by the dotted line of the grille 104 during screen display on the monitor unit 4.

Figure 32:
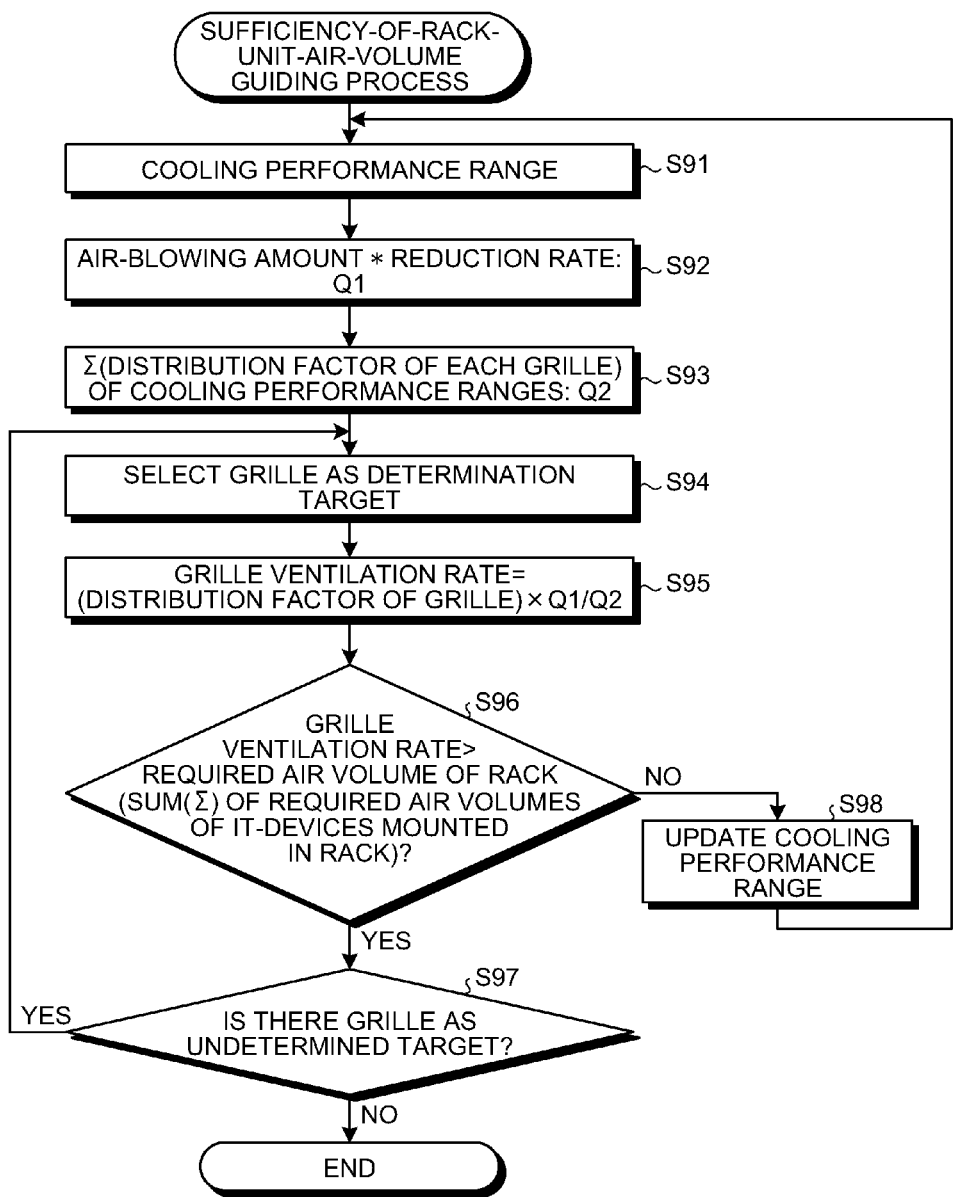
FIG. 32 is a flowchart of a processing operation in the guide-information generation unit related to a sufficiency-of-rack-unit-air-volume guiding process.
Figure 33:
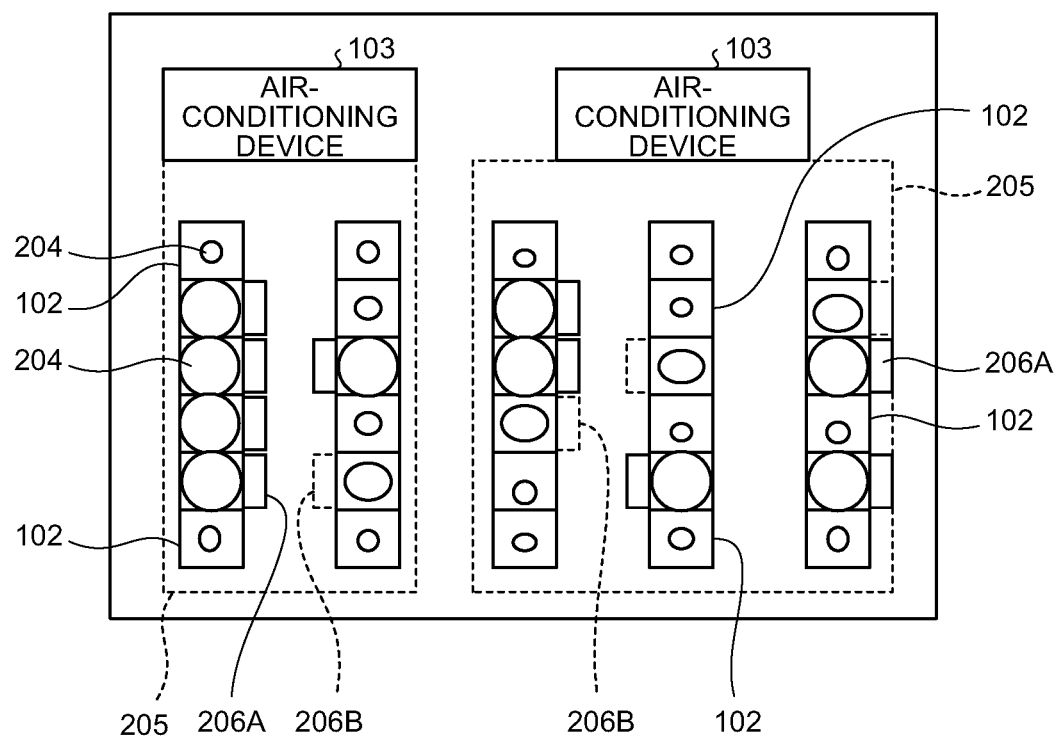
FIG. 33 is an explanatory diagram briefly illustrating a guide content related to the sufficiency-of-rack-unit-air-volume guiding process.

Next, a sufficiency-of-rack-unit-air-volume guiding process will be explained below. FIG. 32 is a flowchart of a processing operation in the guide-information generation unit 9A related to the sufficiency-of-rack-unit-air-volume guiding process, and FIG. 33 is an explanatory diagram briefly illustrating a guide content related to the sufficiency-of-rack-unit-air-volume guiding process.

The sufficiency-of-rack-unit-air-volume guiding process represented in FIG. 32 is a process for guiding a sufficiency of the amount of air blowing for each grille 104 in the cooling performance range 205 with respect to the amount of air blowing of the air-conditioning device 103.

When detecting the cooling performance range 205 of the air-conditioning device 103 as a guiding target on the spatial layout 100 (Step S91), the guide-information generation unit 9A acquires the air-blowing amount 31C corresponding to the type 31A of the air-conditioning device 103 from the air-conditioning feature table 31.

The guide-information generation unit 9A multiplies the air-blowing amount 31C of the air-conditioning device 103 by a predetermined reduction rate, to calculate an estimated air-blowing amount Q1 for air blowing by the air-conditioning device 103 (Step S92). It should be noted that because the air-blowing amount 31C of the air-conditioning device 103 is a normal air-blowing amount as specifications, it is also considered that the normal air-blowing amount may not be ensured depending on an installation environment. Therefore, even if the installation environment is changed, the normal air-blowing amount is multiplied by the predetermined reduction rate, and the estimated air-blowing amount Q1 is thereby calculated as an air-blowing amount capable of being sufficiently ensured in the air-conditioning device 103.

Moreover, when the estimated air-blowing amount Q1 is calculated, the guide-information generation unit 9A recognizes the XY coordinates of the grille 104 in the cooling performance range 205, reads the type 28C corresponding to the XY coordinates 28B from the grille location table 28 in FIG. 11, and reads the distribution factor 35C of the read type 28C (35A) from the grille feature table 35 in FIG. 17. That is, the guide-information generation unit 9A acquires the distribution factor 35C of each of the grilles 104 in the cooling performance range 205.

Furthermore, the guide-information generation unit 9A calculates all the distribution factors Q2 by summing the distribution factors of all the grilles 104 in the cooling performance range 205 of the air-conditioning device 103 (Step S93).

When the grille 104 as a determination target is selected from among the grilles 104 in the cooling performance range 205 (Step S94), the guide-information generation unit 9A calculates a grille ventilation rate of the grille 104 as the determination target based on an expression of (Distribution Factor of the grille 104 as the determination target)*Q1/Q2 (Step S95). It should be noted that the guide-information generation unit 9A sequentially calculates a grille ventilation rate of each of the grilles 104 in the cooling performance range 205.

Moreover, the guide-information generation unit 9A calculates a sum of required air-blowing amounts of the IT-devices 101 mounted in each of the rack devices 102 corresponding to the grille 104 in the cooling performance range 205. It should be noted that the guide-information generation unit 9A reads the rack number 24A of the rack device 102 corresponding to the grille 104 from the rack location table 24 in FIG. 7, and reads the IT numbers 25B of all the IT-devices 101 mounted in the rack device 102 with the rack number 24A (25A) from the rack unit table 25 in FIG. 8. In addition, the guide-information generation unit 9A reads the required air volumes 33C corresponding to the IT numbers 33A of all the IT-devices 101 mounted therein from the IT-device feature table 33 in FIG. 15, and calculates the sum of required air volumes of each rack device 102.

The guide-information generation unit 9A determines whether the grille ventilation rate of the grille 104 as a determination target among the grilles 104 in the cooling performance range 205 is greater than the sum of required air volumes of each rack device 102 corresponding to the grille 104 (Step S96).

If the grille ventilation rate of the grille 104 as a determination target is greater than the sum of required air volumes of each rack device 102 corresponding to the grille 104 (Yes at Step S96), the guide-information generation unit 9A determines that the grille ventilation rate of the grille 104 satisfies the required air volumes of the rack device 102, and determines whether there is a grille 104 as an undetermined target (Step S97).

If there is the grille 104 as an undetermined target (Yes at Step S97), the guide-information generation unit 9A moves to Step S94 to select the grille 104 as an undetermined target from among the grilles 104 in the cooling performance range 205.

If the grille ventilation rate of the grille 104 as a determination target is not greater than the sum of required air volumes of each rack device 102 corresponding to the grille 104 (No at Step S96), the guide-information generation unit 9A updates the cooling performance range 205 by changing the type of the grille 104 or in a similar manner (Step S98), and moves to Step S91.

If there is no grille 104 as an undetermined target in the grilles 104 within the cooling performance range 205 (No at Step S97), the guide-information generation unit 9A determines that the determination process of ventilation rates of all the grilles 104 in the cooling performance range 205 is completed, displays a guide display (see FIG. 33) indicating normal grille setting on the screen of the monitor unit 4, and ends the processing operation represented in FIG. 32.

As a result, the user of the device-layout guiding apparatus 1A can recognize that the grilles 104 arranged in the spatial layout 100 are appropriately installed, by viewing the guide display represented in FIG. 33.

As explained above, the device-layout guiding apparatus 1A guides and displays various device layout guides for the devices in the spatial layout 100 on the monitor unit 4.

That is, the device-layout guiding apparatus 1A can guide and display the layout of the air-conditioning devices 103 in the spatial layout 100 on the screen of the monitor unit 4 in consideration of the cooling performance ranges 205 of the air-conditioning devices 103.

Moreover, the device-layout guiding apparatus 1A can guide and display the additional rack device 102 on the screen of the monitor unit 4 in consideration of the heat generation amount of each rack device 102 and the heat generation amount of the additional IT-device 101.

Furthermore, the device-layout guiding apparatus 1A can guide and display the layout of new rack devices 102 on the screen of the monitor unit 4 in consideration of the heat generation amount of each rack device 102 and the heat generation amounts of other rack devices 102 near the rack device 102.

The device-layout guiding apparatus 1A can also guide and display the necessity or unnecessity of installation of the grille 104 in the rack device 102 in the spatial layout 100 on the screen of the monitor unit 4.

The device-layout guiding apparatus 1A can further guide and display the type of the grille 104 on the screen of the monitor unit 4 in addition to the necessity or unnecessity of installation of the grille 104.

Figure 34:
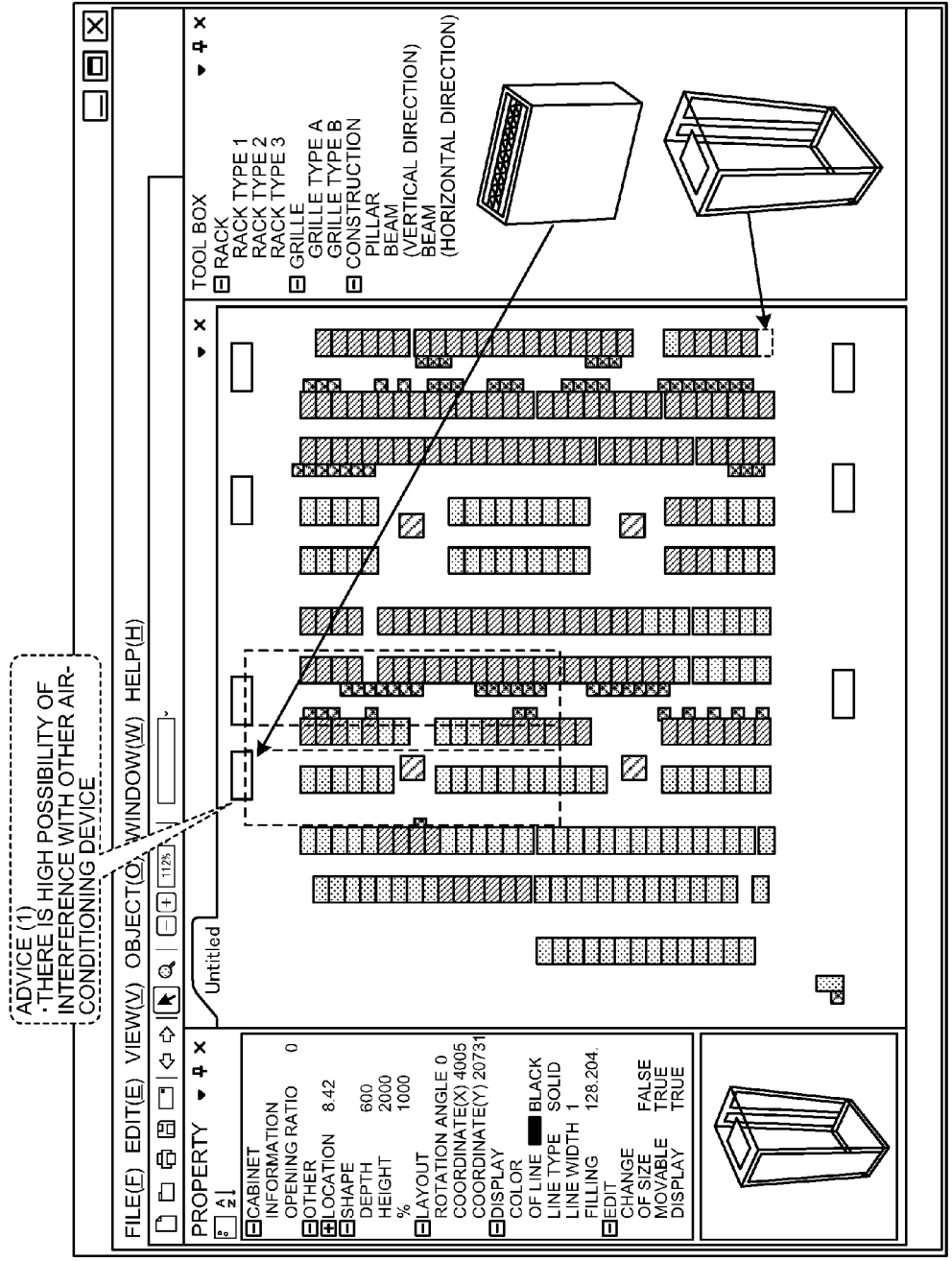
FIG. 34 is an explanatory diagram briefly illustrating a guide content on the monitor screen.

At a time of displaying the cooling performance range for each of the air-conditioning devices 103 on the screen of the monitor unit 4 and if the cooling performance ranges 205 between the air-conditioning devices 103 overlap each other, then the device-layout guiding apparatus 1A can recognize interference between the air-conditioning devices 103 as represented in FIG. 34.

As explained above, the user of the device-layout guiding apparatus 1A recognizes the device-layout guide information beforehand due to the display of various types of device-layout guide information of the devices allowing for the device features based on location information and device features of the devices in the location-information management unit 7A and the device-feature management unit 8A respectively, and then the thermo-fluid analysis process is executed.

The second embodiment is configured to read the location information of the devices arranged in the spatial layout 100 and the device features of the devices from the location-information management unit 7A and the device-feature management unit 8A respectively, generate the device-layout guide information allowing for the device features of the devices based on the read location information and device features, and guide and display the generated device-layout guide information on the monitor unit 4. As a result, by generating the device-layout guide information allowing for the device features of the devices based on the location information and the device features of the devices, the device layout allowing for the device features can be guided quickly and in a simple manner. Moreover, wasteful power consumption of the air-conditioning devices 103 is recognized by the device layout, which results in contribution to, for example, large reduction in power consumption of the air-conditioning devices 103.

In addition, the second embodiment is configured to acquire the sum of cooling amounts of all the air-conditioning devices 103 arranged in the spatial layout 100 and acquire the sum of heat generation amounts of all the air-conditioning devices 103 and all the IT-devices 101 arranged in the spatial layout 100, compare the cooling amounts of all the air-conditioning devices 103 with the heat generation amounts of all the air-conditioning devices 103 and all the IT-devices 101, and display the cooling balance guide including the comparison result (see FIG. 24) on the screen of the monitor unit 4. As a result, the user of the device-layout guiding apparatus 1A can recognize the cooling balance between all the cooling amounts and all the heat generation amounts in the spatial layout 100 based on the cooling balance displayed on the screen of the monitor unit 4.

The second embodiment is also configured to calculate the entire heat generation amounts of all the IT-devices 101 mounted in each of the rack devices 102 arranged in the spatial layout 100 and display the heat generation amount guide (see FIG. 26 and FIG. 27) including the heat generation amounts of each rack device 102 on the screen of the monitor unit 4. As a result, the user of the device-layout guiding apparatus 1A can recognize the heat generation amount of each rack device 102 by the bar graph 203B displayed on the screen.

The second embodiment is further configured to acquire the heat generation amount of each of the IT-devices 101 mounted in the rack device 102 arranged in the spatial layout 100 and display the heat generation amount guide (see FIG. 26) including the heat generation amount of each IT-device 101 on the screen of the monitor unit 4. As a result, the user of the device-layout guiding apparatus 1A can recognize the heat generation amount of each IT-device 101 by the bar graph 203A displayed on the screen.

The second embodiment is also configured to estimate a cooling performance range 205, for each air-conditioning device 103, in which the heat generation amount of each of the IT-devices 101 mounted in the rack device 102 as a cooling target can be cooled down to an appropriate temperature based on the cooling amount and the air-blowing direction of the air-conditioning device 103 arranged in the spatial layout 100 and based on the heat generation amounts of all the IT-devices 101 mounted in the rack device 102, and to display the cooling performance guide (see FIG. 29) including the estimated cooling performance range 205 of the air-conditioning device 103 on the screen of the monitor unit 4. As a result, the user of the device-layout guiding apparatus 1A can recognize the cooling performance range 205 of the air-conditioning device 103 by the cooling performance range 205 displayed on the screen.

The second embodiment is also configured to display an area (see FIG. 34) where the cooling performance ranges 205 of the air-conditioning devices 103 arranged in the spatial layout 100 overlap each other on the screen of the monitor unit 4. As a result, the user of the device-layout guiding apparatus 1A can recognize the interference between the air-conditioning devices 103 in the area where the cooling performance ranges 205 overlap each other displayed on the screen.

The second embodiment is also configured to display the grille installation guide including the necessity or unnecessity of installation of the grille 104, in each rack device 102, through which cooling air from the air-conditioning device 103 flows and also including each grill installed location on the screen of the monitor unit 4 so that the heat generation amounts of all the IT-devices 101 mounted in the rack device 102 within the cooling performance range 205 of the air-conditioning device 103 arranged in the spatial layout 100 becomes an appropriate temperature. As a result, the user of the device-layout guiding apparatus 1A can recognize the necessity or unnecessity of installation of the grille 104 and the grille installed location based on whether the grille 104 is provided in each rack device 102 displayed on the screen of the monitor unit 4.

The second embodiment is also configured to select a type of the grille 104 through which cooling air from the air-conditioning device 103 flows so that the heat generation amounts of all the IT-devices 101 mounted in each rack device 102 in a plurality of types of grilles 104 become an appropriate temperature based on the heat generation amounts of the IT-devices 101 mounted in each rack device 102 within the cooling performance range 205 of the air-conditioning device 103 arranged in the spatial layout 100, and to display the grille installation guide including the selected type of the grille 104 on the screen of the monitor unit 4. As a result, the user of the device-layout guiding apparatus 1A can recognize the type of the grille 104 to be installed by the color of the grille 104 for each rack device 102 displayed on the screen of the monitor unit 4.

The second embodiment is also configured to compare the grille ventilation rate of the grille 104 corresponding to each rack device 102 in the cooling performance range 205 of the air-conditioning device 103 arranged in the spatial layout 100 with the sum of required air volumes of the IT-devices 101 mounted in each rack device 102, and to display the sufficiency-of-rack-unit-air-volume guide including the comparison result on the screen of the monitor unit 4. As a result, the user of the device-layout guiding apparatus 1A can recognize the sufficiency of the air volume of the installed grille 104 for each rack device 102 within the cooling performance range, in each cooling performance range of the air-conditioning devices 103.

It should be noted that in the second embodiment, the rack device 102, excluding the last selected rack device 102 among the rack devices 102 selected at Step S57 at which the cooling-performance guiding process is performed as represented in FIG. 28, is set as a cooling target of the air-conditioning device 103. However, various advices about excess of the cooling capability of the air-conditioning device 103, for example, the advices such as change of type of the air-conditioning device 103 and movement of the IT-device 101 mounted in the rack device 102 may be implemented.

In the second embodiment, the type of the grille 104 includes two types of grille A and grille B for convenience in explanation. However, the type may be three or more types, and, in this case, a grille threshold of each type is set.

The second embodiment has been explained by exemplifying the IT-device 101 and the air-conditioning device 103. However, it goes without saying that the same effect can be obtained even if an illumination device or the like is added in the floor.

Although the embodiments have been explained so far, the scope of the technological idea of the present application is not limited by the embodiments. Thus, it goes without saying that various embodiments can be implemented if these embodiments do not depart from the scope of the technological idea described in the appended claims. In addition, the effects described in the embodiments are not limited thereto.

Moreover, among the various processes explained in the embodiments, it goes without saying that all or a part of the processes explained as these automatically performed can be manually performed and, conversely, all or a part of the processes explained as these manually performed can be automatically performed. In addition, it goes without saying that the processing procedures, control procedures, and information including specific names, various data, and parameters explained in the embodiments can be changed if necessary unless otherwise specified.

The components of the devices represented in the figures are described in a functionally conceptual manner, and thus, they are not always configured physically as represented in the figures. Therefore, it goes without saying that specific modes of the devices are not limited to these modes represented in the figures.

Furthermore, it goes without saying that all or an arbitrary part of the various processing functions performed in the devices may be implemented by CPU (Central Processing Unit) (or micro computer such as MPU (Micro Processing Unit) and MCU (Micro Controller Unit)), or by a program analyzed and implemented by the CPU (or micro computer such as MPU and MCU), or by hardware based on wired logic.

According to an aspect of the device-layout guiding apparatus, the device-layout guiding method, and the device-layout guiding program disclosed in the present application, by generating the device-layout guide information allowing for the device features of devices based on the location information and the device features of the devices arranged in a predetermined space on the screen, the device layout allowing for the device features can be guided quickly and in a simple manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device-layout guiding apparatus for devices arranged in a predetermined space on a screen and including at least an electronic device, an air-conditioning device, and a device housing, said device-layout guiding apparatus including a processor, said processor executing a process comprising:
    reading location information of an air-conditioning device and a device housing stored in a location-information management unit;
    reading a heat generation amount of an electronic device mounted in the device housing, a cooling amount and an air-blowing direction of the air-conditioning device, the heat generation amount, the cooling amount and the air-blowing direction being stored, as device features, in a device-feature management unit;
    estimating a cooling performance range of the air-conditioning device in which heat generation amounts of electronic devices mounted in device housings existing therein as a cooling target can be cooled down to an appropriate condition, based on the read location information of the air-conditioning device and the device housings, the read heat generation amounts of the electronic devices mounted in the device housings, and the read cooling amount and air-blowing direction of the air-conditioning device, the air-conditioning device included in the cooling performance range, of which a shape is determined by the air-blowing direction, and in which the cooling amount is greater than a sum of the heat generation amounts of the electronic devices existing therein;
    generating device-layout guide information including the estimated cooling performance range of the air-conditioning device; and
    outputting the generated device-layout guide information.

2. The device-layout guiding apparatus according to claim 1, wherein
    the devices include a grille through which cooling air from an air-conditioning device flows, and
    the generating includes generating the device-layout guide information including necessity or unnecessity of installation of the grille so that the heat generation amount of all electronic devices mounted in the device housing in the cooling performance range of an air-conditioning device become the appropriate condition, based on the heat generation amount of the electronic devices mounted in the device housing.

3. The device-layout guiding apparatus according to claim 2, wherein
    the devices include grilles with different types of opening ratios of openings formed in their air supply surfaces, and
    the generating includes selecting a grille from among a plurality of types of grilles so that the heat generation amount of the electronic devices mounted in the device housing in the cooling performance range of the air-conditioning device become the appropriate condition, based on the heat generation amount of the electronic devices mounted in the device housing, and generating the device-layout guide information including a result of the selection.

4. The device-layout guiding apparatus according to claim 3, wherein
    the device features include a cooling air-blowing amount of an air-conditioning device and an opening ration of a grille; and
    the generating includes calculating a ventilation rate of the grille based on a cooling air-blowing amount of the air-conditioning device in the cooling performance range and an opening ratio of the grille, determining whether the ventilation rate of the grille satisfies a required air volume of the electronic devices of the device housing set with the grille, and generating the device-layout guide information including a result of the determination.

5. The device-layout guiding apparatus according to claim 1, wherein the outputting includes displaying the device-layout guide information.

6. A device-layout guiding method for devices arranged in a predetermined space on a screen and including at least an electronic device, an air-conditioning device, and a device housing, said device-layout guiding method comprising:
    reading location information of an air-conditioning device and a device housing stored in a location-information management unit;
    reading a heat generation amount of an electronic device mounted in the device housing, a cooling amount and an air-blowing direction of the air-conditioning device, the heat generation amount, the cooling amount and the air-blowing direction being stored, as device features, in a device-feature management unit;

estimating a cooling performance range of the air-conditioning device in which the heat generation amounts of electronic devices mounted in device housings existing therein as a cooling target can be cooled down to an appropriate condition, based on the read location information of the air-conditioning device and the device housings, the read heat generation amounts of the electronic devices mounted in the device housings, and the read cooling amount and air-blowing direction of the air-conditioning device, the air-conditioning device included in the cooling performance range, of which a shape is determined by the air-blowing direction, and in which the cooling amount is greater than a sum of the heat generation amounts of the electronic devices existing therein;

generating, using a processor, device-layout guide information including the estimated cooling performance range of the air-conditioning device; and outputting the generated device-layout guide information.

7. A non-transitory computer readable storage medium having stored therein a device-layout guiding program for devices arranged in a predetermined space on a screen and including at least an electronic device, an air-conditioning device, and a device housing, said device-layout guiding program causing a computer to execute a process comprising:

reading location information of an air-conditioning device and a device housing stored in a location-information management unit;

reading a heat generation amount of an electronic device mounted in the device housing, a cooling amount and an air-blowing direction of the air-conditioning device, the heat generation amount, the cooling amount and the air-blowing direction being stored, as device features, in a device-feature management unit;

estimating a cooling performance range of the air-conditioning device in which the heat generation amounts of electronic devices mounted in device housings existing therein as a cooling target can be cooled down to an appropriate condition, based on the read location information of the air-conditioning device and the device housings, the read heat generation amounts of the electronic devices mounted in the device housings, and the read cooling amount and air-blowing direction of the air-conditioning device, the air-conditioning device included in the cooling performance range, of which a shape is determined by the air-blowing direction, and in which the cooling amount is greater than a sum of the heat generation amounts of the electronic devices existing therein;

generating a device-layout guide information including the estimated cooling performance range of the air-conditioning device; and outputting the generated device-layout guide information.

* * * * *